United States Patent
Pang et al.

(10) Patent No.: US 12,410,928 B2
(45) Date of Patent: Sep. 9, 2025

(54) ENERGY-SAVING CONTROL METHOD AND APPARATUS, SERVER DEVICE, AND HOUSEHOLD APPLIANCE FOR DEMAND RESPONSE TIMING

(71) Applicants: GD MIDEA AIR-CONDITIONING EQUIPMENT CO., LTD., Foshan (CN); MIDEA GROUP CO., LTD., Foshan (CN)

(72) Inventors: Min Pang, Foshan (CN); Xiaoyong Hu, Foshan (CN); Jiwei Hei, Foshan (CN); Qifeng Fan, Foshan (CN); Liwei Luo, Foshan (CN); Chuang Lv, Foshan (CN); Biao Dai, Foshan (CN); Jingchun Liu, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 398 days.

(21) Appl. No.: 17/967,641

(22) Filed: Oct. 17, 2022

(65) Prior Publication Data
US 2023/0314026 A1 Oct. 5, 2023

Related U.S. Application Data

(63) Continuation of application No. PCT/CN2020/100826, filed on Jul. 8, 2020.

(30) Foreign Application Priority Data

Apr. 30, 2020 (CN) .......................... 202010363630.0
Apr. 30, 2020 (CN) .......................... 202010363649.5

(51) Int. Cl.
*F24F 11/47* (2018.01)
*F24F 11/58* (2018.01)
(Continued)

(52) U.S. Cl.
CPC .............. *F24F 11/47* (2018.01); *F24F 11/58* (2018.01); *F24F 11/65* (2018.01); *H02J 3/003* (2020.01);
(Continued)

(58) Field of Classification Search
CPC . Y04S 20/222; Y04S 20/242; Y02B 70/3225; Y02B 70/30; F24F 11/46; G05B 15/02; G05B 23/0235
See application file for complete search history.

(56) References Cited

U.S. PATENT DOCUMENTS 9,813,285 B1 * 11/2017 McGovern ............ G06F 21/316
11,399,065 B1 * 7/2022 Thirumurthy ..... H02J 13/00004
(Continued)

FOREIGN PATENT DOCUMENTS

CN    102736599 A    10/2012
CN    203038070 U    7/2013
(Continued)

OTHER PUBLICATIONS

The China National Intellectual Property Administration (CNIPA) The First Office Action for Chinese Application 202010363630.0 Dec. 3, 2020 20 Pages (With Translation).
(Continued)

*Primary Examiner* — Darrin D Dunn
(74) *Attorney, Agent, or Firm* — Anova Law Group, PLLC

(57) ABSTRACT

An energy-saving control method includes obtaining a demand instruction configured to indicate an energy-saving operation and a performing time slot of the energy-saving operation. The energy-saving operation is determined based on load data of a power grid and is configured to reduce a load of the power grid. The method further includes transmitting a first control message configured to control an
(Continued)

authorized device to perform the energy-saving operation in response to detecting that time reaches the performing time slot, and transmitting a second control message configured to control the authorized device to stop performing the energy-saving operation in response to detecting that time is outside the performing time slot.

18 Claims, 11 Drawing Sheets

(51) Int. Cl.
    *F24F 11/65*     (2018.01)
    *H02J 3/00*     (2006.01)
    *H02J 13/00*     (2006.01)
    *F24F 140/50*     (2018.01)
    *F24F 140/60*     (2018.01)

(52) U.S. Cl.
    CPC ..... *H02J 13/00002* (2020.01); *F24F 2140/50* (2018.01); *F24F 2140/60* (2018.01); *H02J 2310/14* (2020.01); *H02J 2310/54* (2020.01); *H02J 2310/60* (2020.01)

(56) References Cited

U.S. PATENT DOCUMENTS

| | | | | |
|---|---|---|---|---|
| 11,552,941 | B2* | 1/2023 | Kumar | G06F 21/41 |
| 2004/0117330 | A1* | 6/2004 | Ehlers | G06Q 30/0601 |
| | | | | 705/412 |
| 2008/0320290 | A1* | 12/2008 | Moyer | G06F 11/3656 |
| | | | | 712/E9.06 |
| 2011/0264245 | A1* | 10/2011 | Lim | H04L 12/2827 |
| | | | | 700/90 |
| 2012/0046890 | A1* | 2/2012 | Pennington | G01D 4/002 |
| | | | | 702/61 |
| 2012/0123995 | A1* | 5/2012 | Boot | H02J 13/00004 |
| | | | | 706/54 |
| 2012/0310431 | A1* | 12/2012 | Cheetham | G06Q 10/063 |
| | | | | 700/295 |
| 2013/0090777 | A1* | 4/2013 | Lu | H02J 3/14 |
| | | | | 700/297 |
| 2013/0254151 | A1* | 9/2013 | Mohagheghi | H02J 3/003 |
| | | | | 706/46 |
| 2014/0277769 | A1* | 9/2014 | Matsuoka | F24F 11/523 |
| | | | | 700/278 |
| 2014/0303802 | A1* | 10/2014 | Burckard | H02J 4/00 |
| | | | | 700/295 |
| 2015/0094968 | A1* | 4/2015 | Jia | G05B 15/02 |
| | | | | 702/60 |
| 2015/0168001 | A1* | 6/2015 | Steinberg | H04W 4/029 |
| | | | | 236/51 |
| 2015/0324817 | A1* | 11/2015 | Chen | G06Q 50/06 |
| | | | | 705/7.31 |
| 2016/0004297 | A1* | 1/2016 | Kazuno | G06Q 30/06 |
| | | | | 713/320 |
| 2016/0086199 | A1* | 3/2016 | Edmonds | G06Q 50/06 |
| | | | | 705/7.31 |
| 2018/0090929 | A1* | 3/2018 | Roberts | G05B 15/02 |
| 2018/0172309 | A1* | 6/2018 | Niikura | F24F 11/46 |
| 2019/0086110 | A1* | 3/2019 | Okita | G05D 23/1917 |
| 2019/0285299 | A1* | 9/2019 | Steinberg | G05D 23/1951 |
| 2020/0074569 | A1* | 3/2020 | Subbloie | G06Q 20/28 |
| 2020/0106257 | A1* | 4/2020 | Gupta | G08B 21/182 |
| 2020/0204561 | A1* | 6/2020 | Matsuoka | G06Q 50/06 |

FOREIGN PATENT DOCUMENTS

| | | |
|---|---|---|
| CN | 104006488 A | 8/2014 |
| CN | 104374042 A | 2/2015 |
| CN | 105318500 A | 2/2016 |
| CN | 205375032 U | 7/2016 |
| CN | 106969413 A | 7/2017 |
| CN | 107272603 A | 10/2017 |
| CN | 107276096 A | 10/2017 |
| CN | 107579598 A | 1/2018 |
| CN | 107623322 A | 1/2018 |
| CN | 108131722 A | 6/2018 |
| CN | 109634249 A | 4/2019 |
| CN | 110553356 A | 12/2019 |
| JP | 2017180882 A | 10/2017 |

OTHER PUBLICATIONS

The China National Intellectual Property Administration (CNIPA) The Second Office Action for Chinese Application 202010363630.0 Jun. 9, 2021 18 Pages (With Translation).
The China National Intellectual Property Administration (CNIPA) The Rejection Decision for Chinese Application 202010363630.0 Nov. 1, 2022 19 Pages (With Translation).
The China National Intellectual Property Administration (CNIPA) The First Office Action for Chinese Application 202010363649.5 Nov. 21, 2022 23 Pages (With Translation).
Jin Zhou, "Learn to Choose", Sichuan University Press, May 31, 2013, p. 119.
The China National Intellectual Property Administration (CNIPA) The Rejection Decision for Chinese Application 202010363649.5 Jul. 26, 2023 20 Pages (With Translation).

* cited by examiner

Obtaining a demand instruction, wherein the demand instruction is configured to indicate an energy-saving operation and a performing time slot of the energy-saving operation, and the energy-saving operation is determined based on load data of a power grid and power consumption data of an authorized device and is configured to reduce a load of the power grid — 21

Transmitting, in response to detecting that time reaches the performing time slot indicated by the demand instruction, a first control message configured to control the authorized device to perform the energy-saving operation — 22

Transmitting, in response detecting that time Is outside the performing time slot indicated by the demand instruction, a second control message configured to control the authorized device to stop the performing of the energy-saving operation — 23

FIG. 2

ENERGY-SAVING CONTROL METHOD AND APPARATUS, SERVER DEVICE, AND HOUSEHOLD APPLIANCE FOR DEMAND RESPONSE TIMING

CROSS-REFERENCE TO RELATED APPLICATIONS

This application is a continuation application of PCT International Application No. PCT/CN2020/100826, filed on Jul. 8, 2020, which claims priority to Chinese Patent Application No. 202010363649.5, titled "DEVICE CONTROL METHOD AND APPARATUS, SERVER DEVICE, HOUSEHOLD APPLIANCE AND MEDIUM," and No. 202010363630.0, titled "ENERGY-SAVING CONTROL METHOD AND APPARATUS, ELECTRONIC DEVICE AND MEDIUM," filed on Apr. 30, 2020, the entire contents of all of which are incorporated herein by reference for all purpose.

FIELD

The present disclosure relates to the technical field of household appliances, and in particular, to an energy-saving control method and apparatus, a server device, a household appliance, and a medium.

BACKGROUND

At present, due to the hot weather in summer and the cold weather in winter, when summer or winter comes, user's electricity demand increases sharply. In some regions, in order to avoid safety accidents caused by excessive power load, staged or regional power outages are adopted, which is easy to bring great inconvenience to the user.

Therefore, how to reasonably control the electricity demand to not only reduce the inconvenience to the user's life, but also effectively alleviate the electricity load, is an urgent problem to be solved at present.

SUMMARY

The present disclosure aims to solve one of the technical problems in the related art at least to a certain extent.

Therefore, a first object of the present disclosure is to provide an energy-saving control method, which remotely controls an authorized device to perform an energy-saving operation based on a demand instruction. In this way, it is possible to not only improve user's selectivity to bring convenience to user's life, but also achieve an expected energy load reduction to effectively alleviate electricity load.

A second object of the present disclosure is to provide another energy-saving control method.

A third object of the present disclosure is to provide an energy-saving control apparatus.

A fourth object of the present disclosure is to provide another energy-saving control apparatus.

A fifth object of the present disclosure is to provide a server device.

A sixth object of the present disclosure is to provide a household appliance.

A seventh object of the present disclosure is to provide a non-transitory computer-readable storage medium.

To achieve the above objects, an embodiment of a first aspect of the present disclosure provides an energy-saving control method. The method includes: obtaining a demand instruction, where the demand instruction is configured to indicate an energy-saving operation and a performing time slot of the energy-saving operation, and the energy-saving operation is determined based on load data of a power grid and is configured to reduce a load of the power grid; transmitting, in response to detecting that time reaches the performing time slot indicated by the demand instruction, a first control message configured to control an authorized device to perform the energy-saving operation; and transmitting, in response to detecting that time is outside the performing time slot indicated by the demand instruction, a second control message configured to control the authorized device to stop the performing of the energy-saving operation.

According to the energy-saving control method of the embodiments of the present disclosure, after the demand instruction is obtained, in response to detecting that time reaches the performing time slot indicated by the demand instruction, the first control message configured to control the authorized device to perform the energy-saving operation is transmitted, and in response to detecting that time is outside the performing time slot indicated by the demand instruction, the second control message configured to control the authorized device to stop the performing of the energy-saving operation is transmitted. In this way, the authorized device can perform the energy-saving operation based on the demand instruction under remote control, which not only can improve the user's selectivity to bring convenience to the user's life, but also can achieve an expected energy load reduction to effectively alleviate an electricity load.

In addition, the authorization energy-saving control method according to the above embodiments of the present disclosure may also have the following additional technical features.

According to an embodiment of the present disclosure, the method further includes: subsequent to the transmitting, in response to in response to detecting that time reaches the performing time slot indicated by the demand instruction, the first control message configured to control the authorized device to perform the energy-saving operation, obtaining feedback information on an operation status of the authorized device; and determining, based on the feedback information, whether a user manual operation configured to stop the performing of the energy-saving operation is detected by the authorized device.

According to an embodiment of the present disclosure, the demand instruction is further configured to indicate a device identifier of the authorized device. The transmitting, in response to detecting that time reaches the performing time slot indicated by the demand instruction, the first control message configured to control the authorized device to perform the energy-saving operation, includes: generating an energy-saving task for the authorized device based on the energy-saving operation, where the energy-saving task includes the device identifier of the authorized device and a corresponding energy-saving operation; and performing, in response to detecting that time reaches the performing time slot, the energy-saving task, to transmit the first control message based on the device identifier of the authorized device. Correspondingly, the method further includes: subsequent to the determining, based on the feedback information, whether the user manual operation configured to stop the performing of the energy-saving operation is detected by the authorized device, deleting, in response to determining that the user manual operation is detected based on the feedback information, the energy-saving task, and writing, in response to determining that the user manual operation fails to be detected based on the feedback information, the feedback information into the energy-saving task.

According to an embodiment of the present disclosure, the method further includes: subsequent to the performing, in response to detecting that time reaches the performing time slot, the energy-saving task, to transmit the first control message based on the device identifier of the authorized device, deleting, in response to obtaining a deletion instruction or obtaining an updated demand instruction, the energy-saving task.

According to an embodiment of the present disclosure, the method further includes: priori to deleting the energy-saving task, transmitting the second control message based on the device identifier.

According to an embodiment of the present disclosure, the method further includes: subsequent to the transmitting, in response to detecting that time is outside the performing time slot indicated by the demand instruction, the second control message configured to control the authorized device to stop the performing of the energy-saving operation, controlling the authorized device to be restored to an operation status before the energy-saving operation is performed.

According to an embodiment of the present disclosure, the demand instruction is generated in response to a prediction based on environmental parameters that power consumption of the authorized device is greater than an expected power consumption.

According to an embodiment of the present disclosure, the authorized device includes a plurality of air conditioners arranged in a region. The obtaining the demand instruction includes: obtaining power grid load data and air conditioner power consumption data in the region; determining power consumption saving data based on the power grid load data and the power consumption data of the air conditioner; and determining energy-saving operation data of each of the plurality of air conditioners based on the power consumption saving data, an air conditioner energy-saving parameter, and present operation data of each of the plurality of air conditioners in the region. The demand instruction includes the energy-saving operation data of each of the plurality of air conditioners.

According to an embodiment of the present disclosure, the method further includes: prior to the determining the power consumption saving data based on the power grid load data and the air conditioner power consumption data, determining whether the power grid load data satisfies a preset overload condition. Correspondingly, the determining the power consumption saving data based on the power grid load data and the air conditioner power consumption data includes: determining, in response to the power grid load data satisfying the preset overload condition, the power consumption saving data based on the power grid load data and the air conditioner power consumption data.

According to an embodiment of the present disclosure, the determining the energy-saving operation data of each of the plurality of air conditioners based on the power consumption saving data, the air conditioner energy-saving parameter, and the present operation data of each of the plurality of air conditioners in the region, includes: determining a power consumption saving ratio based on the power consumption saving data and the air conditioner power consumption data; determining, for each of the plurality of air conditioners in the region, a power consumption saving amount of the air conditioner based on the power consumption saving ratio and the power consumption amount of the air conditioner; and determining the energy-saving operation data of the air conditioner based on the power consumption saving amount of the air conditioner, the air conditioner energy-saving parameter, and the present operation data of the air conditioner.

According to an embodiment of the present disclosure, the determining the energy-saving operation data of each of the plurality of air conditioners based on the power consumption saving data, the air conditioner energy-saving parameter, and the present operation data of each of the plurality of air conditioners in the region, includes: determining the power consumption saving amount of each of the plurality of air conditioners based on the power consumption saving data and the power consumption amount of each of the plurality of air conditioners in the region; and determining, for each of the plurality of air conditioners in the region, the energy-saving operation data of the air conditioner based on the power consumption saving amount of the air conditioner, the air conditioner energy-saving parameter, and the present operation data of the air conditioner.

According to an embodiment of the present disclosure, the air conditioner energy-saving parameter includes a plurality of air conditioner parameters, and energy-saving amounts of each of the plurality of air conditioner parameters for a plurality of parameter changing statuses. The determining the energy-saving operation data of the air conditioner based on the power consumption saving amount of the air conditioner, the air conditioner energy-saving parameter, and the present operation data of the air conditioner, includes: determining change information on each of the plurality of air conditioner parameters of the air conditioner based on the power consumption saving amount and the present operation data of the air conditioner, and the energy-saving amounts of each of the plurality of air conditioner parameters for the plurality of parameter changing statuses; and determining the energy-saving operation data of the air conditioner based on the present operation data of the air conditioner and the change information on each of the plurality of air conditioner parameters of the air conditioner.

According to an embodiment of the present disclosure, the air conditioner energy-saving parameter further includes weights of the plurality of air conditioner parameters. The determining the change information on each of the plurality of air conditioner parameters of the air conditioner based on the power consumption saving amount and the present operation data of the air conditioner, and the energy-saving amounts of each of the plurality of air conditioner parameters for the plurality of parameter changing statuses, includes: determining the change information on each of the plurality of air conditioner parameter of the air conditioner by sequentially changing each of the plurality of air conditioner parameters of the air conditioner in a descending order of the weights.

According to an embodiment of the present disclosure, the determining the energy-saving operation data of each of the plurality of air conditioners based on the power consumption saving data, the air conditioner energy-saving parameter, and the present operation data of each of the plurality of air conditioners in the region, includes: determining a plurality of sub-regions where air conditioner energy-saving is to be performed, in the region, an energy-saving sorting order of the plurality of sub-regions, and continuous energy-saving time of each of the plurality of sub-regions; and determining, for each of the plurality of sub-regions, energy-saving operation data of respective air conditioners in the sub-region based on the power consumption saving data, the air conditioner energy-saving parameter, and present operation data of the respective air conditioners in the sub-region. Correspondingly, the performing operation control on each of the plurality of air conditioners based on the energy-saving operation data of each of the plurality of air conditioners includes: performing an air conditioner energy-saving operation in turn in each of the plurality of sub-regions based on the energy-saving sorting order, the continuous energy-saving time of each of the plurality of sub-regions, and the energy-saving operation data of each of the respective air conditioners in each of the plurality of sub-regions.

In order to achieve the above object, a second aspect of the present disclosure provides another energy-saving control method. The energy-saving control method includes: obtaining a first control message by an authorized device, where the first control message is transmitted in response to detecting that time reaches a performing time slot indicated by a demand instruction; performing, by the authorized device, an energy-saving operation indicated by the first control message, where the energy-saving operation is determined based on load data of a power grid and is configured to reduce a load of the power grid; obtaining a second control message, where the second control message is transmitted in response to detecting that time is outside the performing time slot indicated by the demand instruction; and enabling the authorized device to stop the performing of the energy-saving operation based on the second control message.

According to the energy-saving control method of the embodiment of the present disclosure, after obtaining the first control message in response to detecting that time reaches the performing time slot indicated by the demand instruction is obtained, the authorized device performs the energy-saving operation indicated by the first control message, and after obtaining the second control message in response to detecting that time is outside the performing time slot indicated by the demand instruction, the authorized device stops performing the energy-saving operation based on the second control information. In this way, it is possible not only improve the user's selectivity to bring convenience to the user's life, but also achieve an expected energy load reduction to effectively alleviate electricity load.

In addition, the energy-saving control method according to the above embodiments of the present disclosure may also have the following additional technical features.

According to an embodiment of the present disclosure, the method further includes: subsequent to performing, by the authorized device, the energy-saving operation indicated by the first control message, detecting a user manual operation, generating feedback information on an operation status of the authorized device in response to the user manual operation, and transmitting the feedback information on the operation status of the authorized device.

According to an embodiment of the present disclosure, the method further includes: subsequent to detecting the user manual operation, stopping, in response to the user manual operation, performing the energy-saving operation, and performing a control instruction indicated by the user manual operation.

According to an embodiment of the present disclosure, the method further includes: subsequent to enabling the authorized device to stop the performing of the energy-saving operation based on the second control message, enabling the authorized device to be restored to an operation status before the energy-saving operation is performed.

In order to achieve the above object, an embodiment of a third aspect of the present disclosure provides an energy-saving control apparatus corresponding to the embodiments of the first aspect. The apparatus includes: an obtaining module configured to obtain a demand instruction, where the demand instruction is configured to indicate an energy-saving operation and a performing time slot of the energy-saving operation, and the energy-saving operation is determined based on load data of a power grid and is configured to reduce a load of the power grid; a first monitoring module configured to transmit, in response to detecting that time reaches the performing time slot indicated by the demand instruction, a first control message configured to control an authorized device to perform the energy-saving operation; and a second monitoring module configured to transmit, in response to detecting that time is outside the performing time slot indicated by the demand instruction, a second control message configured to control the authorized device to stop the performing of the energy-saving operation.

According to the energy-saving control apparatus of the embodiment of the present disclosure, after obtaining the demand instruction by the obtaining module, the first monitoring module transmits the first control message configured to control the authorized device to perform the energy-saving operation in response to detecting that time reaches the performing time slot indicated by the demand instruction, and the second monitoring module transmits the second control message configured to control the authorized device to stop the performing of the energy-saving operation in response to detecting that time is outside the performing time slot indicated by the demand instruction. In this way, the authorized device can perform the energy-saving operation based on the demand instruction under remote control. Thus, it is possible to not only improve the user's selectivity to bring convenience to the user's life, but also achieve an expected energy load reduction to effectively alleviate electricity load.

In addition, the energy-saving control apparatus according to the above embodiments of the present disclosure may also have the following additional technical features.

According to an embodiment of the present disclosure, the authorized device includes a plurality of air conditioners arranged in a region. The obtaining module is further configured to: obtain power grid load data and air conditioner power consumption data in the region; determine power consumption saving data based on the power grid load data and the air conditioner power consumption data; and determine energy-saving operation data of each of the plurality of air conditioners based on the power consumption saving data, an air conditioner energy-saving parameter, and present operation data of each of the plurality of air conditioners in the region. The demand instruction includes the energy-saving operation data of each of the plurality of air conditioners.

According to an embodiment of the present disclosure, the obtaining module is further configured to: determine whether the power grid load data satisfies a preset overload condition, and determine, in response to the power grid load data satisfying the preset overload condition, the power consumption saving data based on the power grid load data and the air conditioner power consumption data.

In order to achieve the above object, an embodiment of a fourth aspect of the present disclosure provides an energy-saving control apparatus corresponding to the embodiments of the second aspect. The energy-saving control apparatus includes: a first obtaining module configured to obtain a first control message, where the first control message is transmitted in response to detecting that time reaches a performing time slot indicated by a demand instruction; a performing module configured to perform an energy-saving operation indicated by the first control message, where the energy-saving operation is determined based on load data of a power grid and is configured to reduce a load of the power grid; a second obtaining module configured to obtain a second control message, where the second control message is transmitted in response to detecting that time is outside the performing time slot indicated by the demand instruction; and a control module configured to stop the performing of the energy-saving operation based on the second control message.

According to the energy-saving control apparatus according to the embodiments of the present disclosure, after obtaining the first control message by the first obtaining module in response to detecting that time reaches the performing time slot indicated by the demand instruction, the energy-saving operation indicated by the first control message is performed by the performing module, and after obtaining the second control information by the second obtaining module in response to detecting that time is outside the performing time slot indicated by the demand instruction, the energy-saving operation is stopped by the control module based on the second control message. In this way, the authorized device can perform the energy-saving operation based on the demand instruction under remote control. Thus, it is possible to not only improve the user's selectivity to bring convenience to the user's life, but also achieve an expected energy load reduction to effectively alleviate electricity load.

In order to achieve the above object, embodiments of a fifth aspect of the present disclosure provides a server device, including a memory, a processor, and a computer program stored on the memory and being executable on the processor. The computer program, when executed by the processor, implements the energy-saving control method according to the embodiment of the first aspect.

The server device in the embodiment of the present disclosure, by performing the energy-saving control method according to the above first aspect of the present disclosure, enables the authorized device to perform the energy-saving operation based on the demand instruction under remote control. In this way, it is possible to not only improve the user's selectivity to bring convenience to the user's life, but also achieve the expected energy load reduction to effectively alleviate the electricity load.

In order to achieve the above object, an embodiment of a sixth aspect of the present disclosure provides a household appliance, including a memory, a processor, and a computer program stored on the memory and being executable on the processor. The computer program, when executed by the processor, implements the energy-saving control method according to the embodiments of the second aspect.

The household appliance in the embodiments of the present disclosure, by performing the energy-saving control method according to the embodiment of the second aspect, can perform the energy-saving operation based on the demand instruction under remote control. In this way, it is possible to not only improve the user's selectivity to bring convenience to the user's life, but also achieve an expected energy load reduction to effectively alleviate electricity load.

In order to achieve the above object, a seventh aspect of the present disclosure of the present disclosure provides a non-transitory computer-readable storage medium having a computer program stored thereon. The computer program, when executed by a processor, implements the energy-saving control method according to the first or second aspect of the present disclosure.

The non-transitory computer-readable storage medium of the embodiment of the present disclosure, by performing the energy-saving control method according to the first or second aspect of the present disclosure, enables the authorized device under remote control to perform the energy-saving operation based on the demand instruction. In this way, it is possible to not only improve the user's selectivity to bring convenience to the user's life, but also achieve an expected energy load reduction to effectively alleviate electricity load.

Additional aspects and advantages of the present disclosure will be set forth, in part, from the following description, and in part will be apparent from the following description, or may be learned by practice of the present disclosure.

BRIEF DESCRIPTION OF DRAWINGS

The above and/or additional aspects and advantages of the present disclosure will become apparent and readily understood from the following description of embodiments in conjunction with the accompanying drawings, in which:

FIG. 2 is a flowchart of an energy-saving control method according to an embodiment of the present disclosure;

DESCRIPTION OF EMBODIMENTS

Figure 1:
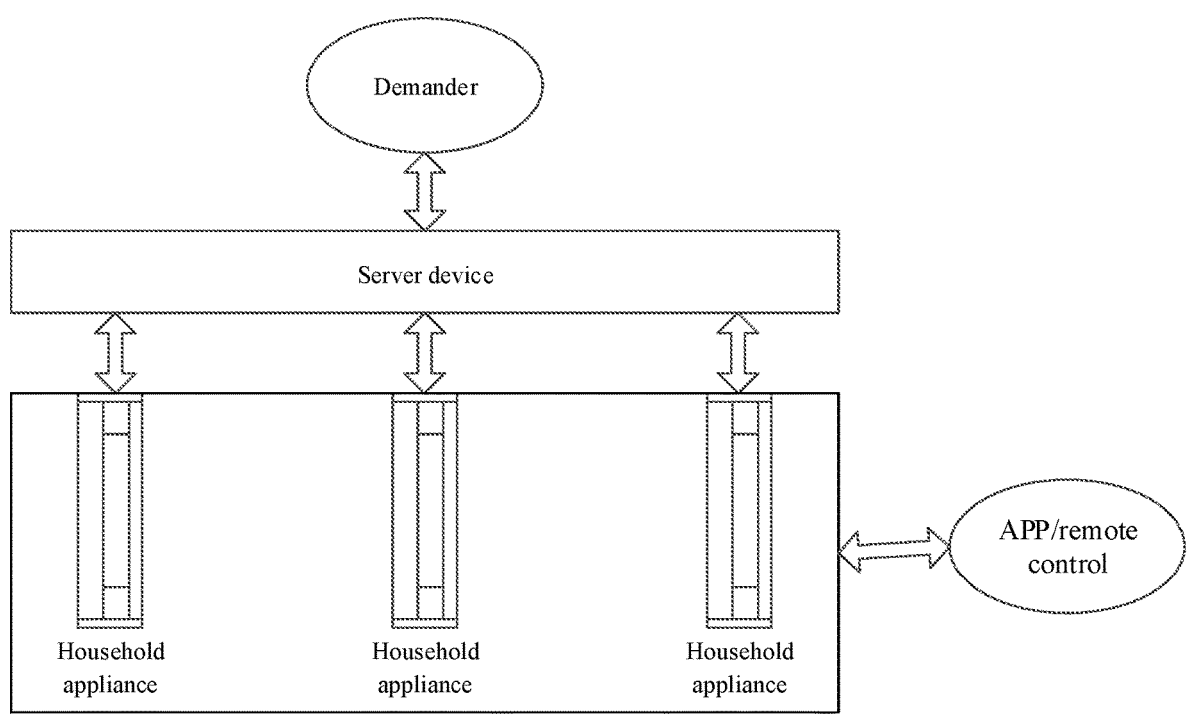
FIG. 1 is a schematic diagram of an energy-saving control system according to an embodiment of the present disclosure.

Embodiments of the present disclosure will be described below in detail. Examples of the embodiments are shown in the accompanying drawings, in which the same or similar reference numerals indicate the same or similar elements or elements having the same or similar functions throughout the drawings. The embodiments described below with reference to the accompanying drawings are exemplary, and are intended to explain the present disclosure, rather than being construed as limitations on the present disclosure.

An energy-saving control method, an apparatus, a server device, a household appliance, and a medium according to embodiments of the present disclosure will be described below with reference to the accompanying drawings.

It should be noted that, as shown in FIG. 1, the energy-saving control system of the present disclosure includes: a demander, a server device, and a household appliance.

The demander may include, but not limited to, a power grid, and may designate the household appliance such as an IoT air conditioner to perform an energy-saving operation based on load data of the power grid, and transmit energy-saving operation data to household appliance through a server device such as a cloud server. The server device is configured to obtain the energy-saving operation data transmitted by the demander, transmit a control instruction to the household appliance based on the energy-saving operation data, obtain the operation data reported by the household appliance, store the operation data and provide it to the demander for decision-making, etc. The household appliance may be provided with a WIFI (Wireless Fidelity) module and a control module. The WIFI module is configured to realize data communication with the server device through an IoT protocol, and the control module is configured to receive the control instruction from the server device (such as temperature, switching machine, air speed, etc.), control an operation of the household appliance, and report the operation data of the household appliance, and the like.

It should be noted that the household appliance may be controlled by an APP (Application) or a remote control. For example, the household appliance may be controlled by an APP installed on a mobile terminal such as a mobile phone, or controlled by the remote control.

It should also be noted that the number of the demanders and the household appliances may be set as desired. For example, there may be a plurality of demanders and a plurality of household appliances. Also, for example, there may be one demander and one household appliance. In addition, for example, there may be one demander and a plurality of household appliances, which are not specifically limited in the present disclosure.

FIG. 2 is a flowchart of an energy-saving control method according to an embodiment of the present disclosure.

In this embodiment, the energy-saving control method is performed by a server device such as a cloud server.

As shown in FIG. 2, the energy-saving control method according to the embodiment of the present disclosure includes the following steps.

At S21, a demand instruction is obtained, where the demand instruction is configured to indicate an energy-saving operation and a performing time slot of the energy-saving operation, and the energy-saving operation is determined based on load data of a power grid and is configured to reduce a load of the power grid.

It should be noted that, in this embodiment, an authorized device may be a device, for example a household appliance such as an air conditioner, a refrigerator, etc., an industrial device, or the like, which is remotely controlled by a user-authorized server device. For example, when the user needs to remotely control the household appliances by the server device, he/she may download a relevant APP (which may be developed by the demander) through the mobile terminal (such as scanning code download, or downloading from an application store), and fill in a device identifier of the household appliance, household number information on an electricity bill, etc. on the APP, so as to authorize the server device to remotely control the household appliance. It may be understood that each household appliance has a unique device identifier corresponding to the household appliance.

The load data of the power grid may include a power grid load value. The demander may predict that power consumption of the authorized device is greater than desired power consumption based on environmental parameters such as future weather and other influencing factors, which indicates that the load data of the power grid is greater than an expected load value. At this time, a demand instruction may be generated and transmitted to the server device such as the cloud server, and a value, by which a load of the power grid needs to be saved, is determined based on the power grid load data. Based on data by which the load of the power grid needs to be saved, power consumption data by which the authorized device should be saved is determined as power consumption saving data. Then, based on the power consumption saving data, energy-saving parameters of the authorized device, and present operation data of the authorized device, energy-saving operation of each authorized device and performing time slot of the energy-saving operation are determined.

For example, when the authorized device is an air conditioner, the energy-saving parameters may include temperature value, air speed value, mode, etc. The modes may include a cooling mode, a heating mode, an air supply mode, etc. Energy-saving amounts of each of the plurality of air conditioner parameters for a plurality of parameter changing statuses, for example, in summer, an energy-saving amount when an air conditioning temperature is increased from 25 degrees to 26 degrees, and in winter, an energy-saving amount when the air conditioning temperature is reduced from 26 degrees to 25 degrees. That is, generally in summer or winter, the operation of the household appliance such as the air conditioner will consume a large amount of electricity, resulting in overload of the power grid. The power consumption of the household appliance in this season is significantly greater than the desired power consumption, and a demand instruction may be generated within a certain time slot in this season, which indicates that an energy-saving operation needs to be performed at the certain time slot. In this way, the operation of the household appliance can be remotely and intelligently controlled by the energy-saving control method according to the present disclosure during the use of the household appliance in summer or winter.

At S22, in response to detecting that time reaches the performing time slot instructed by the demand instruction, a first control message for controlling the authorized device to perform the energy-saving operation is transmitted.

At S23, in response to detecting that time is outside the performing time slot indicated by the demand instruction, a second control message for controlling the authorized device to stop the performing of the energy-saving operation is transmitted.

Specifically, when the demand instruction transmitted from the demander is received by the server device such as the cloud server, the time is detected through a built-in clock of the server device. In response to the time reaching the performing time slot indicated by the demand instruction, the first control message for controlling the authorized device to perform the energy-saving operation is generated and transmitted to the authorized device. In response to the time exceeding the performing time slot instructed by the demand instruction, the second control message for controlling the authorized device to stop the performing of the energy-saving operation is generated and transmitted to the authorized device. In this way, the authorized device can perform corresponding control information.

For example, when the demand side predicts that the power consumption of the household appliance such as the air conditioner is greater than the desired power consumption in periods of time of 10:00 to 16:00 and 21:00 to 24:00 every day in July, then demand instructions may be generated in these two periods of time and transmitted to the server device such as the cloud server. The cloud server generates the first control message in the two periods of time of 10:00 to 16:00 and 21:00 to 24:00 every day in July, and transmits the first control message to the authorized air conditioner so as to authorize the air conditioner to performing a cooling operation, such as adjusting a temperature of the authorized air conditioner from 25° C. to 26° C. for energy saving. In addition, the cloud server generates the second control message in other periods of time except for the two periods of time of 10:00 to 16:00 and 21:00 to 24:00, and transmits it to the authorized air conditioner, so that the air conditioner stops performing the energy-saving operation.

It should be noted that, in order to encourage the user to respond to the energy-saving, rebates may be given to the user of the authorized device remotely controlled by the server device, for example, 20% of the electricity bill is rebated to the account number information corresponding to the electricity bill.

According to the energy-saving control method of the embodiments of the present disclosure, after the demand instruction is obtained, and in response to detecting that time reaches the performing time slot instructed by the demand instruction, the first control message for controlling the authorized device to perform the energy-saving operation is transmitted; in response to detecting that time is outside the performing time slot indicated by the demand instruction, the second control message for controlling the authorized device to stop the performing of the energy-saving operation is transmitted. In this way, the authorized device can perform the energy-saving operation based on the demand instruction under remote control, which can not only improve the user's selectivity to bring convenience to the user's life, and can also achieve the expected energy load reduction to effectively alleviate the electricity load.

Figure 3A:
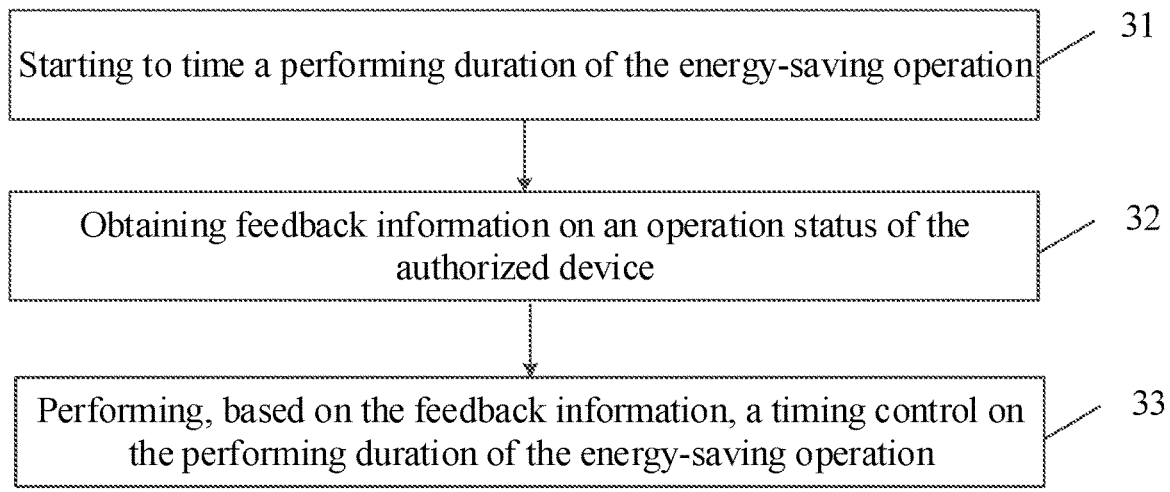
FIG. 3A is a flowchart of an energy-saving control method according to another embodiment of the present disclosure.

Based on the above embodiment, in order to determine a reward issued to the user, in the embodiment, a performing duration of the energy-saving operation may be timed in combination with feedback information on an operation status of the authorized device. Subsequent to the above S22, as shown in FIG. 3A, the method may further include the following steps.

At S31, timing the performing duration of the energy-saving operation is started.

At S32, feedback information on an operation status of the authorized device is obtained.

At S33, timing control on the performing duration of the energy-saving operation is performed based on the feedback information.

Specifically, after the server device transmits the first control information for controlling the authorized device to perform the energy-saving operation to the authorized device, the authorized device performs the energy-saving operation, and starts to time the performing duration of the energy-saving operation. During performing the energy-saving operation, the authorized device feeds back its own operation status to the server device. After receiving the feedback information on the operation status of the authorized device, the server device performs the timing control on the performing duration of the energy-saving operation based on the feedback information. Assuming that the user feels that the present device temperature does not meet his/her needs during performing the energy-saving operation by the authorized device, the device may be remotely controlled (such as adjusting the temperature, turning on or turning off the device, etc.) through the air conditioner APP/the remote control. At this time, the authorized device operates based on an adjustment instruction after receiving the adjustment instruction, and feeds back the adjusted operation status to the server device. After obtaining the feedback information on the operation status of the device, the server device determines whether there is a user manual operation for stopping the energy-saving operation based on the feedback information. When it is determined that there is the user manual operation, the second control message is transmitted based on the device identifier, so as to control the device to stop the performing of the energy-saving operation, and delete the energy-saving task of this device. That is, the user voluntarily terminates the remote control of the authorized device by the server device. At this time, the timing is ended, and the authorized device is rebated based on the timing duration. When it is determined that there is no user manual operation, the feedback information will not be written into the energy-saving task until the device exits the energy-saving task normally after the energy-saving task ends, and the timing is ended and the authorized device is rebated.

That is, in this embodiment, in response to detecting that time reaches the performing time slot, the energy-saving task is performed, and the timing is started at the same time, and the timing control is performed on the performing duration of the energy-saving operation in combination with the feedback information on the operation status of the authorized device, so as to rebate to the authorized device based on the duration. That is, the rebate is based on the timing duration of performing the energy-saving operation by the authorized device. For example, the longer the timing duration, the more the rebates; the shorter the timing duration, the less the rebates.

Figure 3B:
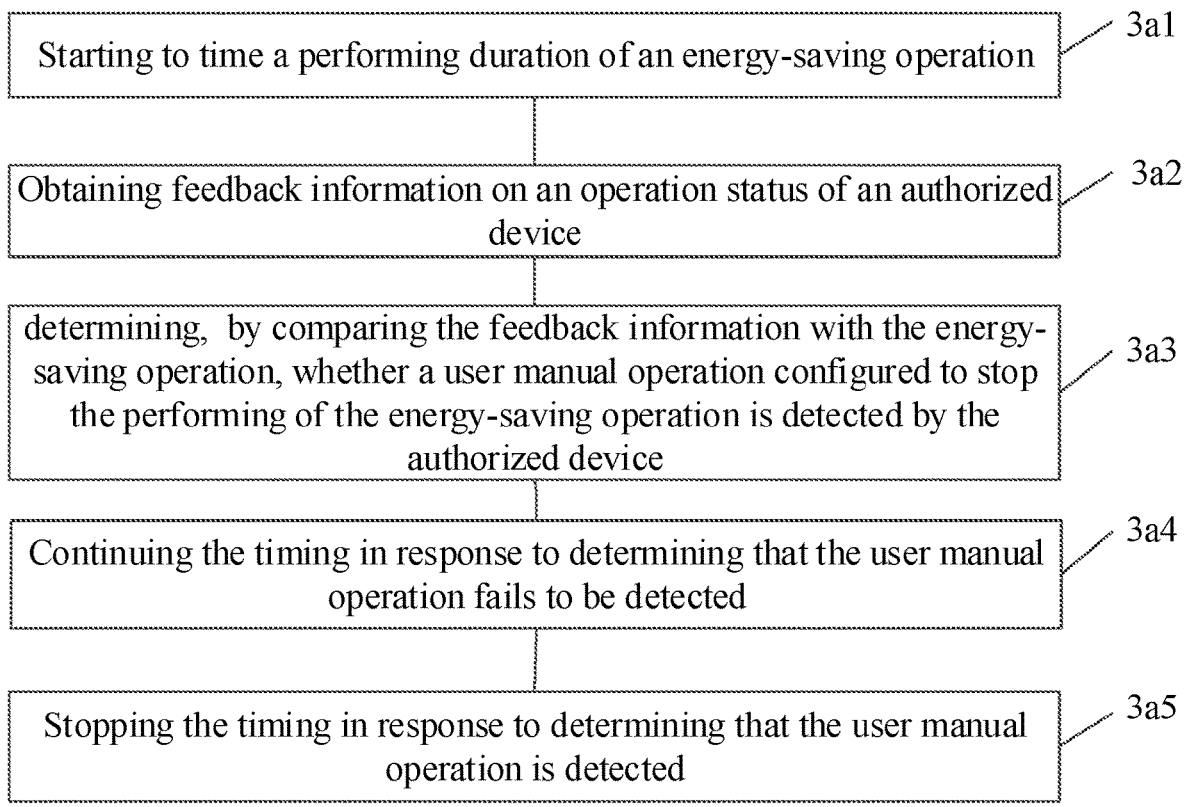
FIG. 3B is a flowchart of a process of timing a performing duration of an energy-saving operation based on feedback information according to an embodiment of the present disclosure.

FIG. 3B is a flowchart of a process of timing the performing duration of the energy-saving operation based on the feedback information according to an embodiment of the present disclosure. This embodiment is a further refinement or optimization on the above embodiment.

As shown in FIG. 3B, the process includes the following steps.

At S3$a$1, the timing of the performing duration of the energy-saving operation is started.

At S3$a$2, the feedback information on the operation status of the authorized device is obtained.

At S3$a$3, it is determined, by comparing the feedback information with the energy-saving operation, whether the user manual operation for stopping the energy-saving operation is detected by the authorized device.

S3$a$3 includes: determining, in response to the feedback information matching the energy-saving operation, that the user manual operation fails to be detected; and determining, in response to the feedback information failing to match the energy-saving operation, that the user manual operation has been detected.

At S3$a$4, in response to determining that the user manual operation fails to be detected, the timing is continued.

At S3a5, in response to determining that the user manual operation is detected, the timing is stopped.

Specifically, after transmitting the first control information for controlling the authorized device to perform the energy-saving operation to the authorized device, the server device enables the authorized device to perform the energy-saving operation, and starts to time the performing duration of the energy-saving operation. During performing the energy-saving operation, the authorized device feeds back its own operation status (a present mode, a present temperature, a present power, etc.) to the server device. After receiving the feedback information on the operation status of the authorized device, the server device compares the feedback information with parameters of the energy-saving operation, such as comparing the present mode, the present temperature, the present power, etc. with the corresponding parameters set for the energy-saving operation, to determine whether the feedback information and the parameters of the energy-saving operation are the same. If not, it means that the user has manually operated the authorized device. For example, during performing the energy-saving operation by the authorized device, the user feels that the present temperature of the device does not meet his/her needs, and the device is remotely controlled by the air conditioner APP/the remote control (such as adjusting the temperature, turning on or turning off the device, etc.). At this time, it is determined that the authorized device has detected the user manual operation for stopping the performing of the energy-saving operation, and then transmits the second control message based on the device identifier, so as to control the device to stop the performing of the energy-saving operation, and delete the energy-saving task of the device. That is, the user voluntarily ends the remote control of the authorized device by the server device. At this time, the timing is ended, and the authorized device will be rebated based on the timing duration. When there is no user manual operation, the feedback information will not be written into the energy-saving task until the device exits the energy-saving task normally after the energy-saving task ends, the timing is stopped, and the authorized device is rebated based on the timing duration.

In the embodiments of the present disclosure, by determining whether there is the user operation, the energy-saving task is managed, and the rebate is determined. In addition, the energy-saving task that has the user operation is deleted and is out of control to reduce the number of the devices to be controlled, and the rebate to the authorized device out of the remote control is ended. Further, the energy-saving task that does not have the user operation is written into the energy-saving task, and the energy-saving task is re-created. Meanwhile, the operation status and real-time control status of the managed device are stored. In this way, through real-time feedback of the operation status and real-time control status of the present device, the control information can be obtained in time, measures can be taken, and the rebate can be determined to prevent the expected energy load reduction effect from being unable to be achieved.

Based on the above embodiments, the method further includes, subsequent to the above S3a1: determining, in response to failing to obtaining the feedback information, that a network of the authorized device is abnormal, and suspending the timing; and accessing the authorized device periodically to obtain the feedback information until the feedback information is obtained, and then resuming the timing.

That is, during remotely controlling the operation of the authorized device, the network of the authorized device may be abnormal. When the network of the authorized device is offline, the timing will be suspended, and the status of the authorized device is continuously queried regularly (for example, every 1 minute) until the feedback information is obtained, and a re-online time of the authorized device is recorded. In addition, an off-line duration is calculated based on the re-online time, and the performing duration is finally calculated.

Based on the above embodiment, subsequent to the above S3a1, the method further includes: stopping the timing in response to determining, based on the feedback information, that an account bound to the authorized device is abnormal.

For example, the feedback information may also include account number information. Specifically, when the account number information obtained by the server device for the last rebate is different from the account number information on the present rebate, after it is determined that the two account number information is different after comparison, it is determined that the account bound to the authorized device is abnormal, which may be bound to another user, and the timing is stopped at this time.

Based on the above embodiment, subsequent to the above S33, the method further includes: generating, based on the feedback information, performing status information on the energy-saving operation; and feeding back the performing duration and/or the performing status information on the energy-saving operation to a transmitting end of the demand instruction.

Specifically, after performing the timing control on the performing duration of the energy-saving operation based on the feedback information, the performing status information on the energy-saving operation is generated based on the feedback information, and is reported to the demander, so that the demander may provide an energy-saving rebate to the user based on the status and the duration.

Figure 4:
FIG. 4 is a flowchart of an energy-saving control method according to yet another embodiment of the present disclosure.

FIG. 4 is a flowchart of an energy-saving control method according to yet another embodiment of the present disclosure. This embodiment is a further refinement or optimization on the above embodiments.

As shown in FIG. 4, the method may include the following steps.

At S401, a demand instruction is obtained, the demand instruction is configured instruct an energy-saving operation, a device identifier of an authorized device, and a performing time slot of the energy-saving operation, where the energy-saving operation is determined based on load data of a power grid and is configured to reduce a load of the power grid.

At S402, an energy-saving task of the authorized device is generated based on the energy-saving operation, where the energy-saving task includes the device identifier of the authorized device and its corresponding energy-saving operation.

At S403, in response to detecting that time reaches the performing time slot, the energy-saving task is performed to transmit, based on the device identifier of the authorized device, a first control message.

At S404, a timing of the performing time slot of the energy-saving operation is started.

At S405, feedback information on the operation status of the authorized device is obtained.

At S406, it is determined, by comparing the feedback information with the energy-saving operation, whether a user manual operation for stopping the energy-saving operation is detected by the authorized device.

At S407, in response to determining that the user manual operation fails to be detected, the timing is continued, and the feedback information is written into the energy-saving task.

At S408, in response to determining that the user manual operation has been detected, the timing is stopped, and the energy-saving task is deleted.

That is, during performing the energy-saving task by the authorized device, the user may combine the feedback information to write the device identifier of the authorized device without the user manual operation into the energy-saving task, and delete the device identifier of the authorized device with the user manual operation from the energy-saving task, so as to further reduce inconvenience to the user's life.

At S409, in response to detecting that time is outside the performing time slot indicated by the demand instruction, a second control message for controlling the authorized device to stop the performing of the energy-saving operation is transmitted.

Specifically, the demander may predict whether the power consumption of the household appliance meets the desired power consumption based on environmental parameters such as future weather and other influencing factors. When the predicted power consumption of the household appliance is greater than an expected value, the demand instruction is generated and transmitted to the server device.

When receiving the demand instruction transmitted by the demander, the server device instructs the authorized device to perform an energy-saving operation. The server device generates the energy-saving task based on the energy-saving operation. The energy-saving task includes the device identifier and the corresponding energy-saving operation. For example, the energy-saving task corresponding to the device identifier AA-WW is to adjust the temperature from 25° C. to 26° C. in July.

The time is detected by the built-in clock. When the time reaches the performing time slot, the first control information is transmitted based on the device identifier, so as to control the device corresponding to the device identifier to perform the first control information, such as the device with the device identifier AA-WW performs the energy-saving task of adjusting the temperature from 25° C. to 26° C. in the two periods of time of 10:00 to 16:00 and 21:00 to 24:00 in July. The authorized device corresponding to the device identifier feeds back its own operation status to the server device during performing the energy-saving operation. After receiving the feedback information on the operation status of the authorized device, the server device compares the feedback information with the parameters of the energy-saving operation, such as comparing the present mode, the present temperature, the present power, etc. with the corresponding parameters set for the energy-saving operation, to determine whether the feedback information and the parameters of the energy-saving operation are the same. When the feedback information and the parameters of the energy-saving operation are not the same, it means that the user has manually operated the authorized device. For example, during performing the energy-saving operation by the authorized device, the user feels that the present temperature of the device does not meet his/her needs, and the device is remotely controlled through the air conditioner APP/the remote control (such as adjusting the temperature, turning on or turning off the device, etc.). At this time, it is determined that the authorized device has detected the user manual operation for stopping the energy-saving operation, and transmits the second control message based on the device identifier. For example, the device with the device identifier AA-WW stops performing the energy-saving task in the periods of time expect these two periods of time of 10:00 to 16:00 and 21:00 to 24:00 in July, so as to control the device with the device identifier to stop the performing of the energy-saving operation, and delete the energy-saving task of the device. That is, the user voluntarily ends the remote control of the authorized device by the server device. At this time, the timing is ended, and the authorized device will be rebated based on the timing duration correspondingly. When there is no user manual operation, the feedback information will not be written into the energy-saving task until the device exits the energy-saving task normally after the energy-saving task is ended, the timing is stopped, and the authorized device is rebated based on the timing duration.

In the energy-saving control method of the embodiment of the present disclosure, after obtaining the demand instruction, the energy-saving task is generated based on the energy-saving operation indicated by the demand instruction. In in response to detecting that time reaches the performing time slot indicated by the demand instruction, the energy-saving task is performed, so as to transmit the first control message based on the device identifier. in response to detecting that time is outside the performing time slot indicated by the demand instruction, the second control message for controlling the device to stop the performing of the energy-saving operation is transmitted, so that the device with the corresponding identification can perform the energy-saving task based on the demand instruction under the remote control, without the need for the user to select whether to accept the control, select the control mode, and select target energy consumption, etc. Thus, it is possible to achieve the expected energy load reduction to effectively alleviate the electricity load and reduces the inconvenience to the user's life.

Based on the above embodiment, in order to enable the authorized device out of control during performing the energy-saving task, subsequent to the above S403, a deletion instruction may also be obtained, or after an updated demand instruction is obtained, the energy-saving task will be deleted.

Specifically, when the demander predicts that the power consumption of the household appliances is smaller than or equal to the desired power consumption based on the environmental parameters, the deletion instruction is generated, or the demand instruction is updated, and the deletion instruction or the updated demand instruction is transmitted to the server device. After receiving the deletion instruction or the updated demand instruction, the server device deletes the energy-saving task, so as to control the authorized device to be out of the control during performing the energy-saving task.

Based on the above embodiments, in order for the device to take actions in time when the control fails or the device is out of the control halfway to achieve the desired energy load reduction effect, before deleting the energy-saving task, the method further includes: transmitting, based on the device identifier, the second control message.

For example, when it is determined by the server device based on the feedback information, that the energy-saving control with the device identifier AA fails, and the device with the device identifier BB is out of the control halfway, the server device transmits the second control message for controlling the device to stop the performing of the energy-saving operation to the devices with the device identifiers AA and BB, to enable the devices with the device identifiers AA and BB to stop the performing of the energy-saving operation, and then the energy-saving tasks with the device identifiers AA and BB is deleted.

Figure 5:
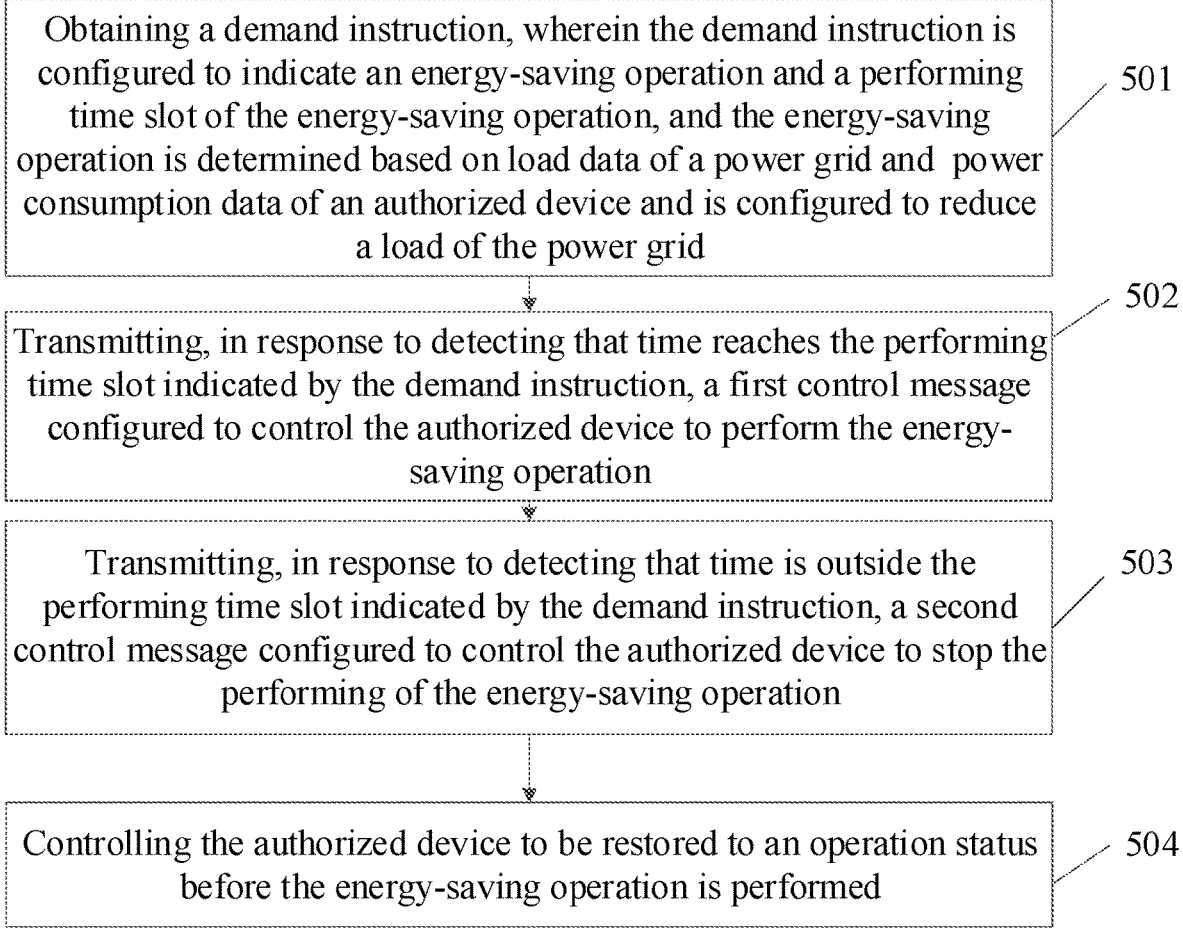
FIG. 5 is a flowchart of an energy-saving control method according to still another embodiment of the present disclosure.

FIG. 5 is a flowchart of an energy-saving control method according to still another embodiment of the present disclosure.

As shown in FIG. 5, the method may include the following steps.

At S501, a demand instruction is obtained. The demand instruction is configured to instruct an energy-saving operation and a performing time slot of the energy-saving operation. The energy-saving operation is determined based on load data of a power grid and is configured to reduce a load of the power grid.

At S502, in response to detecting that time reaches the performing time slot indicated by the demand instruction, a first control message for controlling an authorized device to perform the energy-saving operation is transmitted.

At S503, in response to detecting that time is outside the performing time slot indicated by the demand instruction, a second control message for controlling the authorized device to stop the performing of the energy-saving operation is transmitted.

It should be noted that, for the explanation of the above S501 to S503, reference may be made to the relevant parts of the above embodiments, and the details thereof will be omitted herein.

At S504, the authorized device is controlled to be restored to an operation status before the energy-saving operation is performed.

In the energy-saving control method according to the embodiment of the present disclosure, after the demand instruction is obtained, in response to detecting that time reaches the performing time slot indicated by the demand instruction, the first control message for controlling the authorized device to perform the energy-saving operation is transmitted, and in response to detecting that time is outside the performing time slot indicated by the demand instruction, the second control message for controlling the authorized device to stop the performing of the energy-saving operation is transmitted. In this way, the authorized device can perform the energy-saving operation based on the demand instruction under remote control, which can not only improve the user's selectivity to bring convenience to the life of the user, but also can achieve the expected energy load reduction to effectively alleviate the electricity load. In addition, after the authorized device performs the energy-saving operation, the authorized device is intelligently controlled to be restored to the operation status before the energy-saving operation is performed. Thus, the previous operation status of the authorized device can be automatically restored without any operation by the user.

Figure 6:
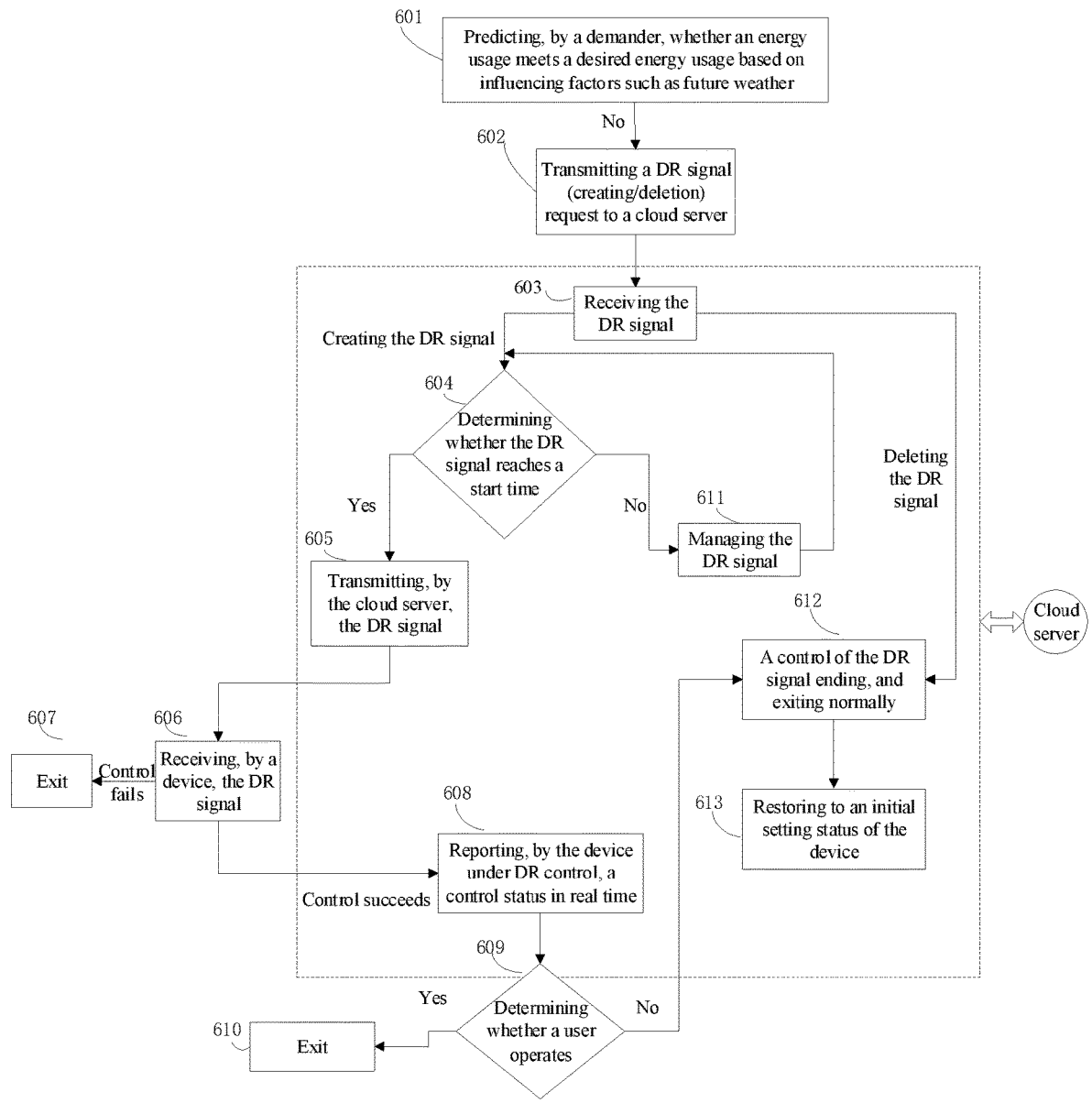
FIG. 6 is a flowchart of an energy-saving control method according to a specific embodiment of the present disclosure.

In order to illustrate the present disclosure more clearly, as shown in FIG. 6, the energy-saving control method of the present disclosure includes the following steps.

At S601, a demander predicts whether an energy usage meets a desired energy usage based on influencing factors such as future weather. When the energy usage fails to meet the desired energy usage, S602 is performed.

At S602, a DR (Demand Request) signal request is transmitted to a server device such as a cloud server. The DR signal includes a creating signal and a deletion signal.

It should be noted that S601 and S602 may be performed by the demander.

At S603, the DR signal is received. It should be noted that, after receiving the DR signal, when the DR signal contains the create signal, S604 is performed; when the DR signal contains the deletion signal, S612 is performed.

At S604, it is determined whether the DR signal reaches a start time. When the DR signal reaches the start time, S605 is performed; when the DR signal fails to reach the start time, S611 is performed.

At S605, the cloud server transmits the DR signal to a device.

At S606, the device receives the DR signal and feeds back an operation status. When a control fails, S607 is performed; when the control succeeds, S608 is performed.

At S607, exit.

At S608, the device is under DR control and a control status is reported in real time.

At S609, it is determined whether an operation is performed by a user through an APP or a remote control, such as adjusting a temperature, turning on or turning off the device, etc., the device will feedback an adjustment instruction to the server device, and the energy-saving control apparatus is controlled to exit the energy-saving operation by the server device.

At S610, exit.

At S611, the DR signal is managed.

At S612, the control of the DR signal ends and exits normally.

At S613, the device is restored to an initial setting status.

It should be noted that, in S603 to S613, the steps enclosed by dotted lines may be performed by the server device such as the cloud server.

Figure 7:
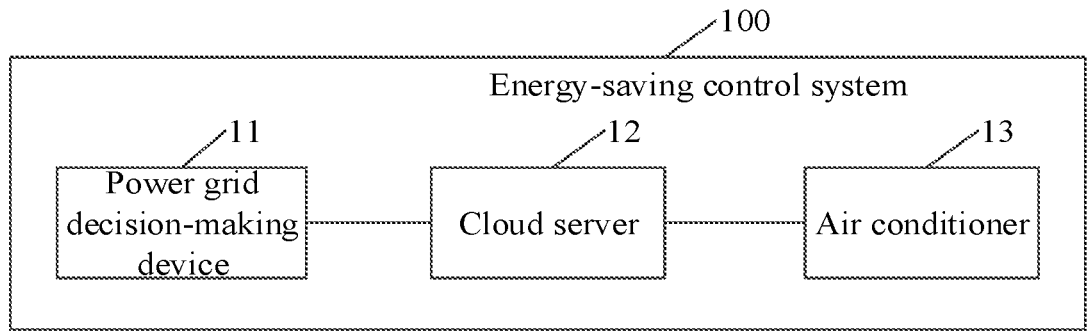
FIG. 7 is a schematic diagram of an energy-saving control system according to a specific example of the present disclosure.

Taking the authorized device including a plurality of air conditioners arranged in a region as an example, the energy-saving control method in this embodiment may be performed by a power grid decision-making device in an energy-saving control system. A schematic diagram of the energy-saving control system may be, for example, as shown in FIG. 7. In FIG. 7, the energy-saving control system 100 includes a power grid decision-making device 11, a cloud server 12, and an air conditioner 13.

The power grid decision-making device 11 may designate a batch of air conditioners to perform an energy-saving operation based on load data of a power grid, and transmit an energy-saving operation data to the batch of air conditioners through the cloud server. The air conditioner 13 may specifically be an IoT air conditioner, and the IoT air conditioner may be provided with a WIFI module and a control module. The WIFI module is configured to realize data communication with the cloud server through an IoT protocol. The control module is configured to receive a control instruction from the cloud server, control an operation of the air conditioner, and report operation data of the air conditioner, etc.

In this embodiment, the cloud server 12 is configured to obtain the energy-saving operation data transmitted from the power grid decision-making device, and transmit control instruction to each air conditioner based on the energy-saving operation data, obtain the operation data reported by the air conditioner, store the operation data and provide the operation data to the power grid decision-making device for decision-making, etc.

Figure 8:
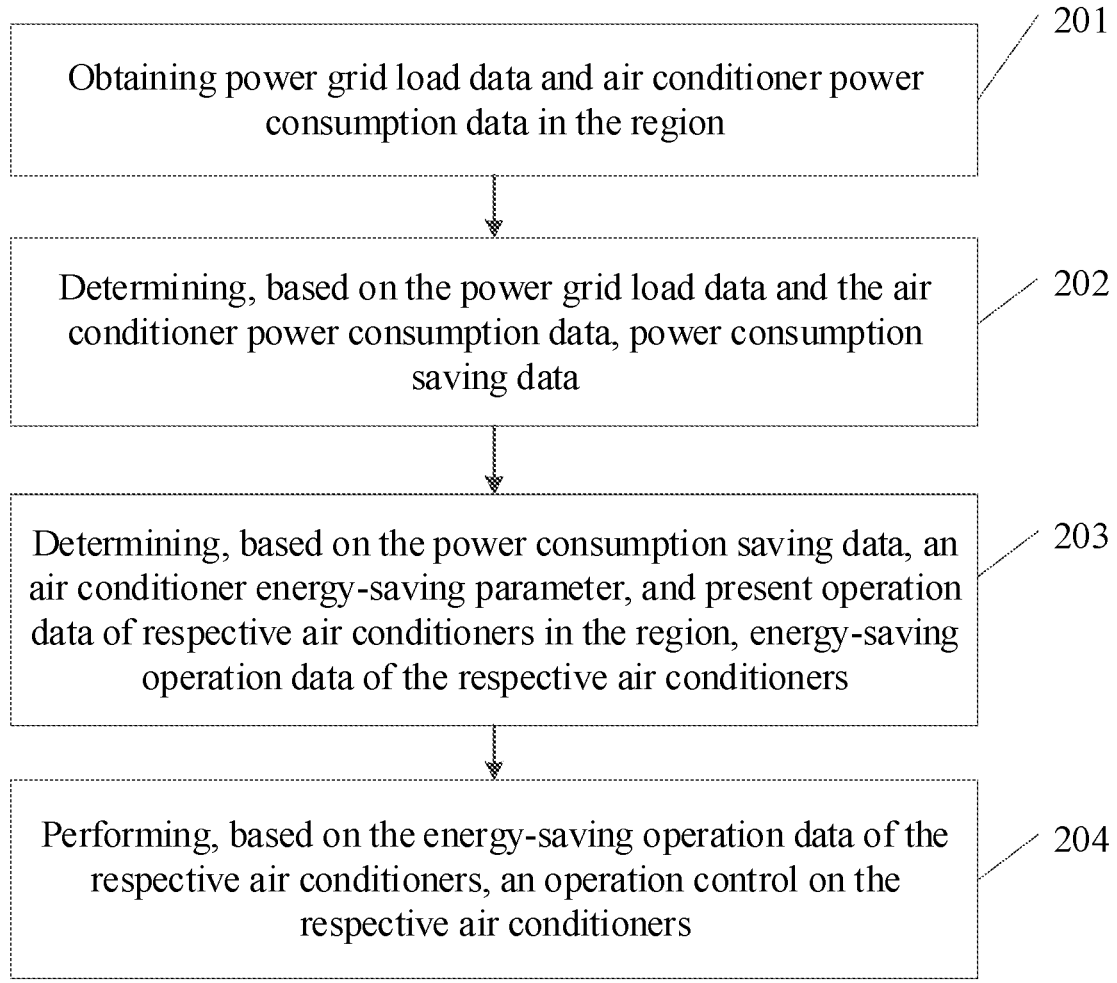
FIG. 8 is a schematic flowchart of an energy-saving control method according to a specific example of the present disclosure.

FIG. 8 is a schematic flowchart of an energy-saving control method according to an embodiment of the present disclosure. As shown in FIG. 8, the energy-saving control method according to this embodiment includes the following steps.

At S201, load data of a power grid and power consumption data of an air conditioner in a region is obtained.

In this embodiment, the load data of the power grid may include a power grid load value etc. The power consumption data of the air conditioner may include a power, a rotational speed, etc.

At S202, power consumption saving data is determined based on the load data of the power grid and the power consumption data of the air conditioner.

In this embodiment, before S202 is performed, the method may further include: determining whether the load data of the power grid satisfies a preset overload condition. Correspondingly, the process of performing S202 may be, for example, determining, in response to the load data of the power grid satisfying the preset overload condition, the power consumption saving data based on the load data of the power grid and the power consumption data of the air conditioner. The overload condition may be, for example, that the power grid load value is greater than a preset load value, or the like. The power grid load value may be an average power grid load value within a time slot. When the load data of the power grid satisfies the overload condition, a value of the power grid load to be saved is determined based on the load data of the power grid and the overload condition, and the power consumption data of the air conditioner to be saved is determined as the power consumption saving data based on the load data of the power grid to be saved and the power consumption data of the air conditioner.

In this embodiment, generally in summer or winter, the operation of the air conditioner will consume a large amount of electricity, causing the power grid overload. Therefore, the energy-saving control method in this embodiment is mainly applied in the summer or winter scenario.

At S203, an energy-saving operation data of each of the air conditioners is determined based on the power consumption saving data, the air conditioner energy-saving parameter, and the present operation data of each of the air conditioners in the region.

The demand instruction in the above S21 includes the energy-saving operation data of each of the air conditioners obtained in S203. That is, the above S21 includes S201 to S203.

In this embodiment, in a first implementation scenario, the process of performing S203 may be, for example, determining, based on the power consumption saving data and the power consumption data of the air conditioner, a power consumption saving ratio; determining, based on the power consumption saving ratio and a power consumption amount of the air conditioner, a power consumption saving amount of the air conditioner for each of the air conditioners in the region; and determining, based on the power consumption saving amount of the air conditioner, the air conditioner energy-saving parameter, and the present operation data of the air conditioner, the energy-saving operation data of the air conditioner.

In this embodiment, the power consumption saving ratio may be a ratio of the power consumption saving data to the power consumption data of the air conditioner. In this embodiment, the power consumption saving data may include power consumption to be saved, and/or the power consumption saving ratio.

In this embodiment, in s second implementation scenario, the process of performing S203 may be, for example, determining, based on the power consumption saving data and the power consumption amount of each of the air conditioners in the region, the power consumption saving amount of each of the air conditioners; and determining, based on the power consumption saving amount of the air conditioner, the air conditioner energy-saving parameter, and the present operation data of the air conditioner, the energy-saving operation data of the air conditioner for each of the air conditioners in the region.

In this embodiment, the air conditioner energy-saving parameter may specifically include a plurality of air conditioner parameters, and energy saving amounts of each of the plurality of air conditioner parameters for a plurality of parameter changing statuses. Correspondingly, the energy-saving control apparatus determining, based on the power consumption saving amount of the air conditioner, the air conditioner energy-saving parameter, and the present operation data of the air conditioner, the energy-saving operation data of the air conditioner, specifically includes: determining, based on the power consumption saving amount and the present operation data of the air conditioner, and the energy-saving amounts of each of the plurality of air conditioner parameters for the plurality of parameter changing statuses, change information on each of the air conditioner parameters of the air conditioner; and determining, based on the present operation data of the air conditioner and the change information on each of the air conditioner parameters of the air conditioner, the energy-saving operation data of the air conditioner.

The air conditioner parameters may include a temperature value, an air speed value, a mode, etc. The mode includes, for example, a cooling mode, a heating mode, a ventilation mode, etc. Energy-saving amounts of each of the plurality of air conditioner parameters for a plurality of parameter changing statuses, for example, in the summer scenario, an energy-saving amount when the air conditioner temperature rises from 25° C. to 26° C., and in the winter scenario, an energy-saving amount when the air conditioner temperature decreases from 26° C. to 25° C.

In this embodiment, on the basis of the above embodiments, the air conditioner energy-saving parameter further includes weights of a plurality of air conditioner parameters. Correspondingly, the energy-saving control apparatus determining, based on the power consumption saving amount and the present operation data of the air conditioner, and the energy-saving amounts of each of the plurality of air conditioner parameters for the plurality of parameter changing statuses, the change information on each of the air conditioner parameters of the air conditioner, may be, for example, determining, by sequentially changing each of the air conditioner parameters of the air conditioner in a descending order of the weights, and determining the change information on each of the air conditioner parameters of the air conditioner.

For example, when the air conditioner parameters include the temperature value, the air speed value, the mode, and the weights of the temperature is greater than the weights of the air speed, in the summer scenario, for the air conditioner, the temperature parameter is first changed, for example, the temperature parameter is reduced by 1° C., and the energy-saving amount when the temperature parameter is reduced by 1° C. is determined. If the energy-saving amount when the temperature parameter is reduced by 1° C. is greater than or equal to the power consumption saving amount of the air conditioner, the changing of other air conditioner parameters is stopped. If the energy-saving amount when the temperature parameter is reduced by 1° C. is smaller than the power consumption saving amount of the air conditioner, the air speed value will be changed to enable a total energy-saving amount of the air conditioner is greater than or equal to the power consumption saving amount of the air conditioner.

In this embodiment, on the basis of the above embodiments, the air conditioner energy-saving parameter may include energy-saving parameters of various types of air conditioners. There are various types such as high-power intelligent air conditioners, small-function intelligent air conditioners, non-intelligent air conditioners, etc. For different types of air conditioners, the energy-saving amount of the same air conditioner parameter for the same parameter change status may be different. By setting the energy-saving parameters of various types of air conditioners, the energy-saving operation parameters of each air conditioner may be finely controlled to improve accuracy of the energy-saving control.

In this embodiment, in a third implementation scenario, in order to avoid long-term energy-saving control on the air conditioner and to shorten an energy-saving operation time of the air conditioner, the process of performing S203 may also be, for example, determining in the region a plurality of sub-regions where the air conditioner energy-saving is to be performed, an energy-saving sorting order of the plurality of sub-regions, and continuous energy-saving time of each of the plurality of sub-regions; and determining, based on the power consumption saving data, the air conditioner energy-saving parameters, and the present operation data of each of the air conditioners in the plurality of sub-regions, the energy-saving operation data of each of the air conditioners in the plurality of sub-regions for each of the plurality of sub-regions.

The plurality of sub-regions where the air conditioner energy-saving is to be performed are sub-regions where the air conditioner energy-saving may be performed, such as a user region. For example, a sub-region where the air conditioner energy-saving is not required may be a large data center or the like. The region may be divided based on geographic location information on each air conditioner in the region, to obtain the plurality of sub-regions. The energy-saving sorting order of the plurality of sub-regions may be, for example, an ascending sorting order based on importance of each of the plurality of sub-regions. The continuous energy-saving time of the plurality of sub-regions may be set based on the importance of each of the plurality of sub-regions or demand. For example, the continuous energy-saving time of a sub-region A is 10 minutes, the continuous energy-saving time of a sub-region B is 30 minutes, and so on.

At S204, an operation control is performed on each of the air conditioners based on the energy-saving operation data of each of the air conditioners.

In the third implementation scenario, the process of performing S204 may be, for example, performing, based on the energy-saving sorting order, the continuous energy-saving time of each of the plurality of sub-regions, and the energy-saving operation data of each of the air conditioners in each of the plurality of sub-regions, and performing the air conditioner energy-saving operation in turn in each of the plurality of sub-regions.

The technical solutions in the above embodiments of the present disclosure have at least the following technical effects or advantages.

1. the power consumption saving data is determined based on the load data of the power grid and the power consumption data of the air conditioner. The energy-saving operation data of each of the air conditioners is determined based on the power consumption saving data, the air conditioner energy-saving parameter, and the present operation data of each of the air conditioners in the region. Thus, when the power grid load in the region is too large, the energy-saving operation is performed on each of the air conditioners in the region, which reduces the power grid load to avoid troubles to users due to power outages, thereby improving user experience. Thus, good timeliness and energy-saving efficiency can be provided.

2. The air conditioner energy-saving parameter include a plurality of air conditioner parameters, and the energy-saving amounts of each of the plurality of air conditioner parameters for the plurality of parameter changing statuses, to determine the energy-saving operation data of each of the air conditioners in combination with the air conditioner energy-saving parameter and the power consumption saving data. Thus, it is possible to avoid making drastic changes to the parameter of each of the air conditioners, thereby further avoiding interference to users.

3. The energy-saving operation is performed in turn in each of the plurality of sub-regions, which can shorten the energy-saving operation time of the air conditioners in each of the plurality of sub-regions, and avoid long-term energy-saving control on the plurality of air conditioners, thereby further avoiding the interference to users.

Based on the same inventive concept, embodiments of the present disclosure also provide an apparatus corresponding to the method in the above embodiments.

Figure 9:
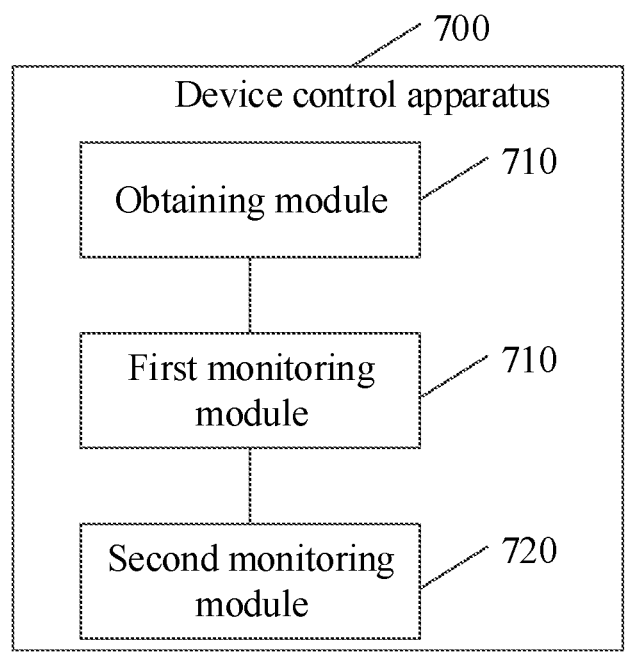
FIG. 9 is a schematic block diagram of an energy-saving control apparatus according to an embodiment of the present disclosure.

FIG. 9 is a schematic block diagram of an energy-saving control apparatus according to an embodiment of the present disclosure. As shown in FIG. 9, an energy-saving control apparatus 700 in this embodiment includes an obtaining module 710, a first monitoring module 720, and a second monitoring module 730.

The obtaining module 710 is configured to obtain a demand instruction. The demand instruction is configured to instruct an energy-saving operation and a performing time slot of the energy-saving operation. the energy-saving operation is determined based on load data of a power grid and is configured to reduce a load of the power grid. The first monitoring module 720 is configured to transmit, in response to detecting that time reaches the performing time slot indicated by the demand instruction, a first control message for controlling an authorized device to perform the energy-saving operation. The second monitoring module 730 is configured to transmit, in response to detecting that time is outside the performing time slot indicated by the demand instruction, a second control message for controlling the authorized device to stop the performing of the energy-saving operation.

According to an embodiment of the present disclosure, the first monitoring module 720 is further configured to: subsequent to transmitting, in response to detecting that time reaches the performing time slot indicated by the demand instruction, the first control message for controlling the authorized device to perform the energy-saving operation, start to time a performing duration of the energy-saving operation, obtain feedback information on an operation status of the authorized device, and perform timing control on the performing duration of the energy-saving operation based on the feedback information.

According to an embodiment of the present disclosure, the first monitoring module 720 performing the timing control on the performing duration of the energy-saving operation based on the feedback information specifically includes: determining, by comparing the feedback information with the energy-saving operation, whether a user manual operation for stopping the performing of the energy-saving operation is detected by the authorized device; continuing the timing in response to determining that the user manual operation fails to be detected; and stopping the timing in response to determining that the user manual operation is detected.

According to an embodiment of the present disclosure, determining, by comparing the feedback information with the energy-saving operation, whether the user manual operation for stopping the performing of the energy-saving operation is detected by the authorized device, includes: determining, in response to the feedback information matching the energy-saving operation, that the user manual operation fails to be detected; and determining, in response to the feedback information mismatching the energy-saving operation, that the user manual operation is detected.

According to an embodiment of the present disclosure, the first monitoring module 720 is further configured to: subsequent to starting to time the performing duration of the energy-saving operation, determine, in response to failing to obtaining the feedback information, that a network of the authorized device is abnormal, and suspend the timing; and access periodically the authorized device to obtain the feedback information until the feedback information is obtained, and then resume the timing.

According to an embodiment of the present disclosure, the first monitoring module 720 is further configured to: subsequent to starting to time the performing duration of the energy-saving operation, stop the timing in response to determining, based on the feedback information, that an account bound to the authorized device is abnormal.

According to an embodiment of the present disclosure, the first monitoring module 720 is further configured to: subsequent to in response to detecting that time is outside the performing time slot indicated by the demand instruction, stop the timing for the performing duration of the energy-saving operation.

According to an embodiment of the present disclosure, the first monitoring module 720 is further configured to: subsequent to performing, based on the feedback information, the timing control on the performing duration of the energy-saving operation, generate, based on the feedback information, performing status information on the energy-saving operation; and feedback the performing duration and/or the performing status information on the energy-saving operation to a transmitting end of the demand instruction.

According to an embodiment of the present disclosure, the demand instruction is further configured to instruct a device identifier of the authorized device. The first monitoring module 720 transmitting, in response to detecting that time reaches the performing time slot indicated by the demand instruction, the first control message for controlling the authorized device to perform the energy-saving operation includes: generate, based on the energy-saving operation, an energy-saving task of the authorized device. The energy-saving task includes the device identifier of the authorized device and the corresponding energy-saving operation, and perform, in response to detecting the time reaches the performing time slot, the energy-saving task, to transmit the first control message based on the device identifier of the authorized device. Correspondingly, the first monitoring module 720 is further configured to: subsequent to determining, by comparing the feedback information with the energy-saving operation, whether a user manual operation for stopping the performing of the energy-saving operation is detected by the authorized device, delete, in response to determining that the user manual operation is detected, the energy-saving task, and write, in response to determining that the user manual operation fails to be detected, the feedback information into the energy-saving task.

According to an embodiment of the present disclosure, the first monitoring module 720 is further configured to: subsequent to performing, in response to detecting that time reaches the performing time slot, the energy-saving task to transmit, based on the device identifier of the authorized device, the first control message, obtain a deletion instruction, or delete, in response to obtaining an updated demand instruction, the energy-saving task.

According to an embodiment of the present disclosure, the first monitoring module 720 is further configured to: prior to deleting the energy-saving task, transmit, based on the device identifier, the second control message.

According to an embodiment of the present disclosure, the second monitoring module 730 is further configured to: subsequent to transmitting, in response to detecting that time is outside the performing time slot indicated by the demand instruction, the second control message for controlling the authorized device to stop the performing of the energy-saving operation, control the authorized device to be restored to the operation status before the energy-saving operation is performed.

According to an embodiment of the present disclosure, the demand instruction is generated in response to a prediction that the power consumption of the authorized device is greater than an expected power consumption based on environmental parameters.

Taking the authorized device including a plurality of air conditioners arranged in a region as an example, the obtaining module 710 is specifically configured to: obtain load data of a power grid and power consumption data of the air conditioner in the region; determine, based on the load data of the power grid and the power consumption data of the air conditioner, power consumption saving data; and determine, based on the power consumption saving data, the air conditioner energy-saving parameter, and present operation data of each of the plurality of air conditioners in the region, energy-saving operation data of each of the plurality of air conditioners. The demand instruction includes the energy-saving operation data of each of the plurality of air conditioners.

In this example, the first monitoring module 720 is specifically configured to transmit the energy-saving operation data of each of the plurality of air conditioners to the corresponding air conditioner, so that each of the plurality of air conditioners operates based on the energy-saving operation data of each of the plurality of air conditioners.

Further, the obtaining module 710 is specifically configured to: determine whether the load data of the power grid satisfies a preset overload condition, and determine, in response to the load data of the power grid satisfying the preset overload condition, the power consumption saving data based on the load data of the power grid and the power consumption data of the air conditioner.

Further, the obtaining module 710 is specifically configured to: determine, based on the power consumption saving data and the power consumption data of the air conditioner, a power consumption saving ratio; determine, based on the power consumption saving ratio and a power consumption amount of the air conditioner, a power consumption saving amount of the air conditioner for each of the plurality of air conditioners in the region; and determine, based on the power consumption saving amount of the air conditioner, the air conditioner energy-saving parameter, and the present operation data of the air conditioner, the energy-saving operation data of the air conditioner.

Further, the obtaining module 710 is specifically configured to: determine, based on the power consumption saving data and the power consumption amount of each of the plurality of air conditioners in the region, the power consumption saving amount of each of the plurality of air conditioners; and determine, based on the power consumption saving amount of the air conditioner, the air conditioner energy-saving parameter, and the present operation data of the air conditioner, the energy-saving operation data of the air conditioner for each of the plurality of air conditioners in the region.

Further, the air conditioner energy-saving parameter include a plurality of air conditioner parameters, and energy-saving amounts of each of the plurality of air conditioner parameters for a plurality of parameter changing statuses.

The obtaining module 710 is specifically configured to: determine, based on the power consumption saving amount and the present operation data of the air conditioner, and the energy-saving amounts of each of the plurality of air conditioner parameters for the plurality of parameter changing statuses, change information on each of the plurality of air conditioner parameters of the air conditioner; and determine, based on the present operation data of the air conditioner and the change information on each of the plurality of air conditioner parameters of the air conditioner, the energy-saving operation data of the air conditioner.

Further, the air conditioner energy-saving parameter further includes weights of the plurality of air conditioner parameters.

The obtaining module 710 is specifically configured to: determine, by sequentially changing each of the plurality of air conditioner parameters of the air conditioner in a descending order of the weights, the change information on each of the plurality of air conditioner parameters of the air conditioner.

Further, the obtaining module 710 is specifically configured to: determine in the region a plurality of sub-regions where the air conditioner energy-saving is to be performed, an energy-saving sorting order of the plurality of sub-regions, and continuous energy-saving time of each of the plurality of sub-regions; and determine, based on the power consumption saving data, the air conditioner energy-saving parameter, and the present operation data of each of the plurality of air conditioners in the plurality of sub-regions, the energy-saving operation data of each of the plurality of air conditioners in the plurality of sub-regions for each of the plurality of sub-regions; correspondingly, perform, based on the energy-saving sorting order, the continuous energy-saving time of each of the plurality of sub-regions, and the energy-saving operation data of each of the plurality of air conditioners in each of the plurality of sub-regions, the air conditioner energy-saving operation in turn in each of the plurality of sub-regions.

It should be understood that the above apparatus is configured to perform the method in the above embodiments, and the implementation principle and technical effect of the corresponding program modules in the apparatus are similar to those described in the above method, and the operating process of the apparatus may refer to the corresponding process in the above method, and the detailed description thereof will be omitted herein.

According to the energy-saving control apparatus according to the embodiment of the present disclosure, after obtaining the demand instruction through the obtaining module, in response to detecting that time reaches the performing time slot indicated by the demand instruction, the first control message for controlling the authorized device to perform the energy-saving operation is transmitted by the first monitoring module, and in response to detecting that time is outside the performing time slot indicated by the demand instruction, the second control message for controlling the authorized device to stop the performing of the energy-saving operation is transmitted by the second monitoring module. In this way, the authorized device can perform the energy-saving operation based on the demand instruction under remote control, which can improve the user's selectivity to bring convenience to the user's life, and can achieve the expected energy load reduction to effectively alleviate the electricity load.

In order to implement the above embodiments, the present disclosure also provides a server device. The server device includes a memory, a processor, and a computer program stored on the memory and being executable on the processor. The computer program, when executed by the processor, implements the energy-saving control method provided by the above embodiments.

The server device in the embodiments of the present disclosure, by performing the energy-saving control method provided by the above embodiments, enables the authorized device to perform the energy-saving operation based on the demand instruction under remote control, which not only can improve the user's selectivity to bring convenience to the user's life, but also can achieve the expected energy load reduction to effectively alleviate the electricity load.

Figure 10A:
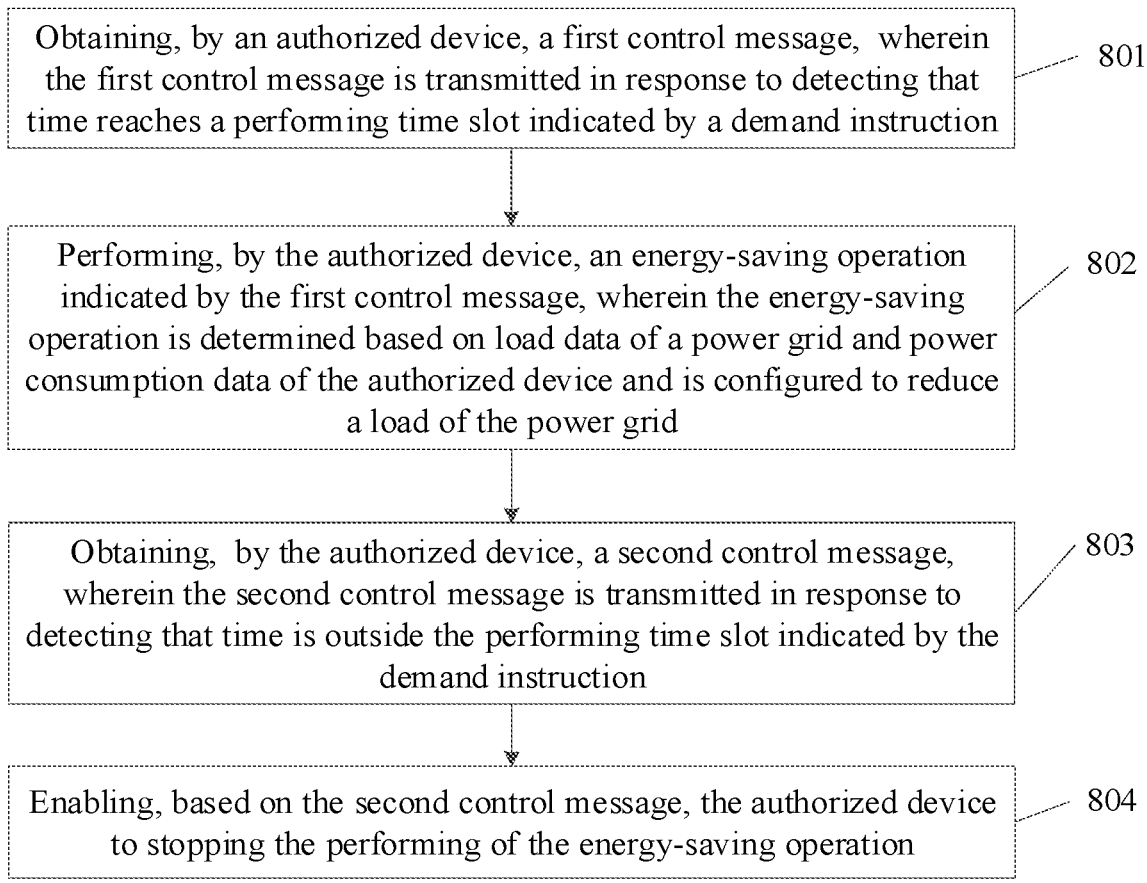
FIG. 10A is a flowchart of another energy-saving control method according to an embodiment of the present disclosure.

FIG. 10A is a flowchart of another energy-saving control method according to an embodiment of the present disclosure.

In this embodiment, the energy-saving control method is performed by an authorized device.

As shown in FIG. 10A, the energy-saving control method according to the embodiment of the present disclosure includes the following steps.

At S801, a first control message is obtained by an authorized device. The first control message is transmitted in response to detecting that time reaches a performing time slot indicated by a demand instruction.

At S802, an energy-saving operation instructed by the first control message is performed by the authorized device. The energy-saving operation is determined based on load data of a power grid and is configured to reduce a load of the power grid.

At S803, a second control message is obtained by the authorized device. The second control message is transmitted in response to detecting that time is outside the performing time slot indicated by the demand instruction.

At S804, the authorized device stops, based on the second control message, performing the energy-saving operation.

It should be noted that, in this embodiment, the authorized device may be a device, for example a household appliance (such as an air conditioner, a refrigerator, etc.), an industrial device, or the like, which is remotely controlled by a user-authorized server device. For example, when the user needs to remotely control the household appliances by the server device, he/she may download an APP (which may be developed by the demander) through the mobile terminal (such as scanning code download, or downloading from the application store), and fill in a device identifier of the household appliance, household number information on the electricity bill, etc. on the APP, so as to authorize the server device to remotely control household appliance. It may be understood that each household appliance has a unique device identifier corresponding to the household appliance.

The load data of the power grid may include a power grid load value. The demander may predict that the power consumption of the authorized device is greater than desired power consumption based on environmental parameters such as future weather and other influencing factors, which indicates that the load data of the power grid is greater than an expected load value. At this time, a demand instruction may be generated and transmitted to the server device such as the cloud server, and a value, by which a load of the power grid needs to be saved, is determined based on the load data of the power grid. Based on data by which the load of the power grid needs to be saved, power consumption data by which the authorized device should be saved is determined as power consumption saving data. Then, based on the power consumption saving data, the energy-saving parameters of the authorized device, and the present operation data of the authorized device, the energy-saving operation of each authorized device and the performing time slot of the energy-saving operation are determined.

For example, when the authorized device is an air conditioner, the energy-saving parameter may include temperature value, air speed value, mode, etc. The modes may include a cooling mode, a heating mode, an air supply mode, etc. Energy-saving amounts of each of the plurality of air conditioner parameters for a plurality of parameter changing statuses, for example, in summer, an energy-saving amount when an air conditioning temperature rises from 25° C. to 26° C., and in winter, an energy-saving amount when the air conditioning temperature decreases from 26° C. to 25° C. That is, generally in summer or winter, the operation of the household appliance such as the air conditioner will consume a large amount of electricity, resulting in overload of the power grid. The power consumption of the household appliance in this season is significantly greater than the desired power consumption, and a demand instruction may be generated within a certain time slot in this season, which indicates that an energy-saving operation needs to be performed at the certain time slot. In this way, the operation of the household appliance can be remotely and intelligently controlled by the energy-saving control method according to the present disclosure during the use of the household appliance in summer or winter.

When the demand instruction transmitted from the demander is received by the server device such as the cloud server, the time is detected through the built-in clock of the server device. In response to the time reaching the performing time slot indicated by the demand instruction, the first control message for controlling the authorized device to perform the energy-saving operation is generated and transmitted to the authorized device. In response to the time exceeding the performing time slot indicated by the demand instruction, the second control message for controlling the authorized device to stop the performing of the energy-saving operation is generated and transmitted to the authorized device.

After receiving the first control message, the authorized device is controlled to perform the energy-saving operation indicated by the first control message, and after receiving the second control message, the authorized device stops performing the energy-saving operation.

For example, when the demand side predicts that the power consumption of the household appliance such as the air conditioner is greater than the desired power consumption in periods of time of 10:00 to 16:00 and 21:00 to 24:00 every day in July, then demand instructions may be generated in these two periods of time and transmitted to the server device such as the cloud server. The cloud server generates the first control message in the two periods of time of 10:00 to 16:00 and 21:00 to 24:00 every day in July, and transmits the first control message to the air conditioner. The air conditioner controls its cooling based on the first control information, for example, adjusting the temperature from 25° C. to 26° C. for the energy saving. In addition, the cloud server generates the second control message in other periods of time except for the two periods of time of 10:00 to 16:00 and 21:00 to 24:00, and transmits the second control message to the air conditioner, and the air conditioner controls the air conditioner to stop the performing of the energy-saving operation.

It should be noted that, in order to encourage the user to respond to the energy-saving, rebates may be given to the user of the authorized device remotely controlled by the server device, for example, 20% of the electricity bill is rebated to the corresponding account number information.

In the energy-saving control method of the embodiment of the present disclosure, after obtaining the first control message in response to detecting that time reaches the performing time slot indicated by the demand instruction, the energy-saving operation indicated by the first control message is performed. After obtaining the second control information in response to detecting that time is outside the performing time slot indicated by the demand instruction, the energy-saving operation is stopped based on the second control message. In this way, the authorized device can perform the energy-saving operation based on the demand instruction under remote control, which not only can improve the user's selectivity to bring convenience to the user's life, but also can achieve the expected energy load reduction to effectively alleviate the electricity load.

Figure 10B:
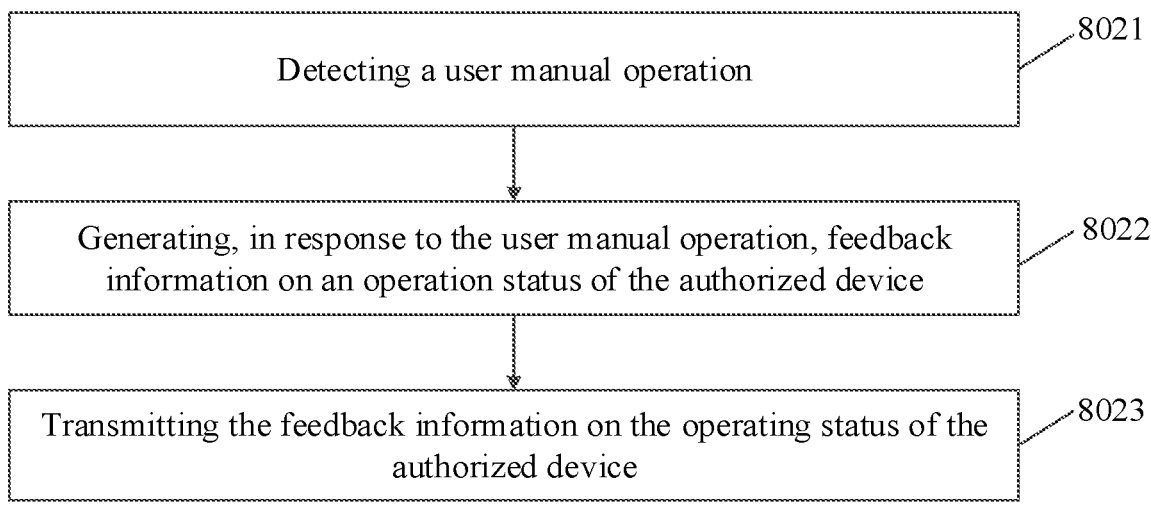
FIG. 10B is a flowchart of another energy-saving control method according to another embodiment of the present disclosure.

In an embodiment of the present disclosure, in order to determine the reward issued to the user, in the embodiment, it may be determined whether the user terminates the remote control in combination with the feedback information on the operation status of the authorized device. Subsequent to the above S802, as shown in FIG. 10B, the method further includes the following steps.

At S8021, a user manual operation is detected.

At S8022, in response to the user manual operation, feedback information on an operation status of the authorized device is generated.

At S8023, the feedback information on the operation status of the authorized device is transmitted.

Specifically, after the server device transmits the first control information for controlling the authorized device to perform the energy-saving operation to the authorized device, the authorized device performs the energy-saving operation, and starts to time the performing time duration of the energy-saving operation. During performing the energy-saving operation, the authorized device feeds back its own operation status to the server device. After receiving the feedback information on the operation status of the authorized device, the server device performs the timing control on the performing duration of the energy-saving operation based on the feedback information. Assuming that the user feels that the present device temperature does not meet his/her needs during performing the energy-saving operation by the authorized device, the device may be remotely controlled (such as adjusting the temperature, turning on or turning off the device, etc.) through the air conditioner APP/the remote control. At this time, the authorized device operates based on an adjustment instruction after receiving the adjustment instruction, and feeds back the adjusted operation status to the server device. After obtaining the feedback information on the operation status of the device, the server device determines whether there is a user manual operation for stopping the energy-saving operation based on the feedback information. When it is determined that there is the user manual operation, the second control message is transmitted based on the device identifier, so as to control the device to stop the performing of the energy-saving operation, and delete the energy-saving task of the device. That is, the user voluntarily terminates the remote control of the authorized device by the server device. At this time, the timing is ended, and the authorized device is rebated based on the timing duration. When it is determined that there is no user manual operation, the feedback information will not be written into the energy-saving task until the device exits the energy-saving task normally after the energy-saving task ends, and the timing is ended and the authorized device is rebated.

That is, in this embodiment, in response to detecting that time reaches the performing time slot, the energy-saving task is performed, and the timing is started at the same time, and the timing control is performed on the performing duration of the energy-saving operation in combination with the feedback information on the operation status of the authorized device, so as to rebate to the authorized device based on the duration. That is, the rebate is based on the timing duration of performing the energy-saving operation by the authorized device. For example, the longer the timing duration, the more the rebates; the shorter the timing duration, the less the rebates.

It should be noted that during remotely controlling the operation of the authorized device, the following situations may also exist: a network of the authorized device may be abnormal. When the network of the authorized device is offline, the timing will be suspended and the status of the authorized device is continuously queried regularly (for example, every 1 minute), until the feedback information is obtained, and a re-online time of the authorized device is recorded. In addition, an off-line duration is calculated based on the re-online time, and the performing duration is finally calculated. When the account number information obtained by the server device for the last rebate is different from the account number information on the present rebate, it is determined that the account bound to the authorized device is abnormal, which may be bound by another user, and the timing is stopped at this time. Thereafter, after the timing control is performed on the performing duration of the energy-saving operation by the server device based on the feedback information, the performing status information on the energy-saving operation is generated based on the feedback information, and reported to the demander, so that the demander may provide the energy-saving rebate to the user based on the status and duration.

In an embodiment of the present disclosure, subsequent to the above S8021, the method further includes: in response to the user manual operation, stopping the performing of the energy-saving operation, and performing a control instruction indicated by the user manual operation.

That is, after the authorized device is controlled by the user through the authorized device APP/the remote controller (such as adjusting the temperature, turning on or turning off the device, etc.), the authorized device no longer performs the energy-saving operation in response to the user manual operation, and is controlled to operate based on the control instruction transmitted from the user.

Figure 11:
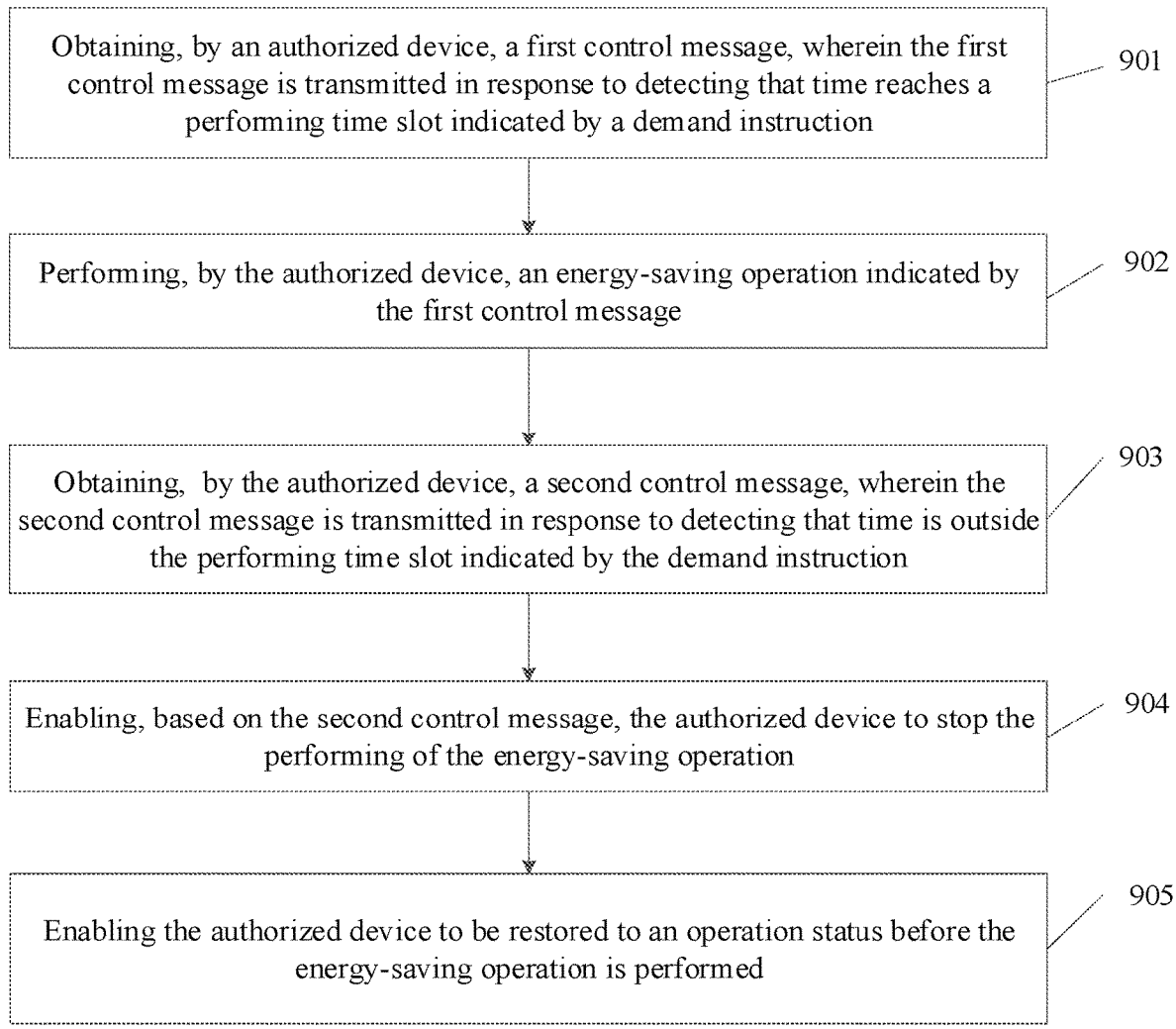
FIG. 11 is a flowchart of another energy-saving control method according to yet another embodiment of the present disclosure.

FIG. 11 is a flowchart of another energy-saving control method according to yet another embodiment of the present disclosure.

As shown in FIG. 11, the method includes the following steps.

At S901, a first control message is obtained by an authorized device. The first control message is transmitted in response to detecting that time reaches a performing time slot indicated by a demand instruction.

At S902, an energy-saving operation indicated by the first control message is performed by the authorized device.

At S903, a second control message is obtained by the authorized device. The second control message is transmitted in response to detecting that time is outside the performing time slot indicated by the demand instruction.

At S904, the authorized device, based on the second control message, stops performing the energy-saving operation.

It should be noted that, for the explanation of the above S801 to S804, reference may be made to the relevant parts of the above embodiments, and the detailed description thereof will be omitted herein.

At S905, the authorized device is restored to an operation status prior to performing the energy-saving operation.

According to the energy-saving control method of the embodiment of the present disclosure, after obtaining the first control message in response to detecting that time reaches the performing time slot indicated by the demand instruction, the authorized device performs the energy-saving operation indicated by the first control message; after obtaining the second control information in response to detecting that time is outside the performing time slot indicated by the demand instruction, the energy-saving operation is stopped based on the second control information, which not only can improve the user's selectivity to bring convenience to the user's life, but also can achieve the expected energy load reduction to effectively alleviate the electricity load. In addition, after the authorized device performs the energy-saving operation, the authorized device is intelligently controlled to be restored to the operation status before the energy-saving operation is performed. Therefore, the previous operation status of the authorized device can be automatically restored without any operation by the user.

Based on the same inventive concept, embodiments of the present disclosure also provide an apparatus corresponding to the method in the above embodiments.

Figure 12:
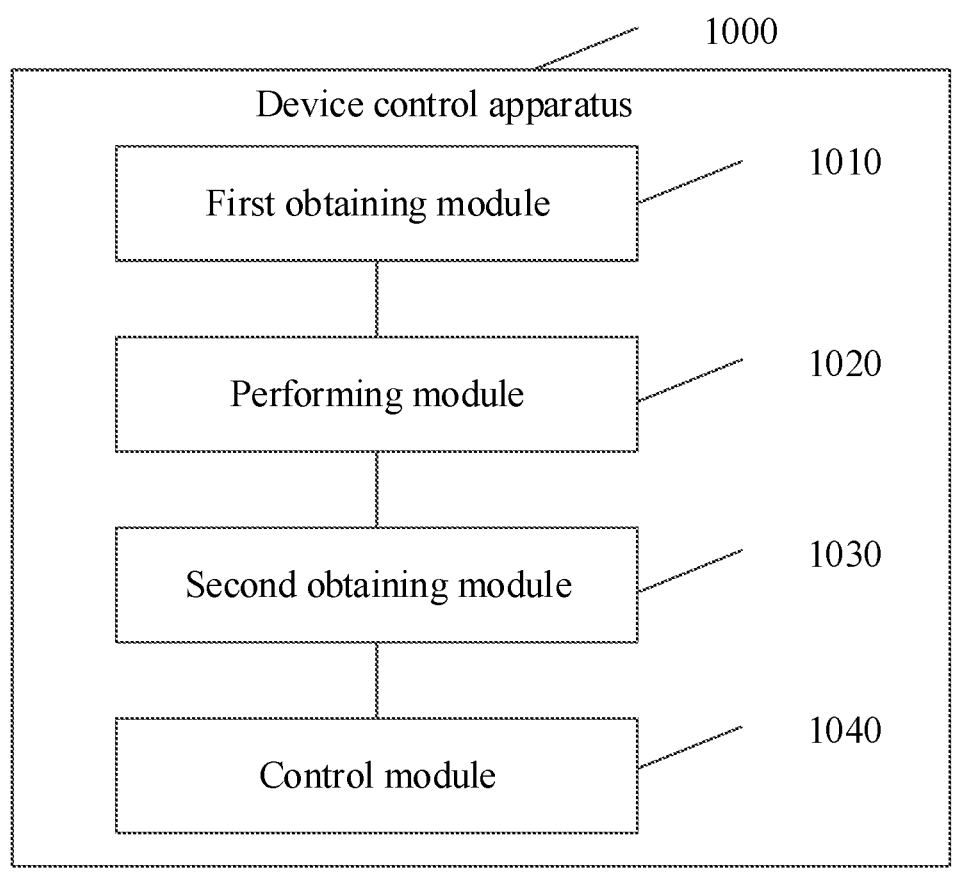
FIG. 12 is a schematic block diagram of another energy-saving control apparatus according to an embodiment of the present disclosure.

FIG. 12 is a schematic block diagram of another energy-saving control apparatus according to an embodiment of the present disclosure. As shown in FIG. 12, an energy-saving control apparatus 1000 in this embodiment includes: a first obtaining module 1010, a performing module 1020, a second obtaining module 1030, and a control module 1040.

The first obtaining module 1010 is configured to obtain a first control message. The first control message is transmitted in response to detecting that time reaches the performing time slot indicated by the demand instruction. The performing module 1020 is configured to perform an energy-saving operation indicated by the first control message. The energy-saving operation is determined based on load data of a power grid and power consumption data of the authorized device and is configured to reduce a load of the power grid. The second obtaining module 1030 is configured to obtain a second control message. The second control message is transmitted in response to detecting that time is outside the performing time slot indicated by the demand instruction. The control module 1040 is configured to stop, based on the second control message performing the energy-saving operation.

According to an embodiment of the present disclosure, the performing module 1020 is further configured to: subsequent to performing the energy-saving operation indicated by the first control message, detect a user manual operation; generate, in response to the user manual operation, feedback information on an operation status of the authorized device;

and transmit the feedback information on the operation status of the authorized device.

According to an embodiment of the present disclosure, the performing module 1020 is further configured to: subsequent to detecting the user manual operation, stop, in response to the user manual operation, performing the energy-saving operation, and perform a control instruction indicated by the user manual operation.

According to an embodiment of the present disclosure, the control module 1040 is further configured to: subsequent to controlling, based on the second control message, the authorized device to stop the performing of the energy-saving operation, control the authorized device to be restored to the operation status before the energy-saving operation is performed.

It should be understood that the above apparatus is configured to perform the method in the above embodiments, and the implementation principle and technical effect of the corresponding program module in the apparatus are similar to those described in the above method, and the operating process of the apparatus may refer to the corresponding process in the above method, and the detailed description thereof will be omitted herein.

According to the energy-saving control apparatus according to the embodiment of the present disclosure, after obtaining, in response to detecting the time reaches the performing time slot indicated by the demand instruction, through the first obtaining module, the energy-saving operation indicated by the first control message is performed by the performing module. After obtaining, in response to detecting that time is outside the performing time slot indicated by the demand instruction, the second control information through the second obtaining module, the performing of the energy-saving operation is stopped by the control module based on the second control message. In this way, the authorized device can perform the energy-saving operation based on the demand instruction under remote control, which not only can improve the user's selectivity to bring convenience to the user's life, but also can achieve the expected energy load reduction to effectively alleviate the electricity load.

In order to implement the above embodiments, the present disclosure also provides a household appliance. The household appliance includes a memory, a processor, and a computer program stored on the memory and being executable on the processor. The computer program, when executed by the processor, implements the energy-saving control method provided by the above embodiments.

With the household appliance in the embodiments of the present disclosure, by performing the energy-saving control method provided by the above embodiments, the household appliance can perform the energy-saving operation based on the demand instruction under the remote control, which not only can improve the user's selectivity to bring convenience to the user's life, but also can achieve the expected energy load reduction to effectively alleviate the electricity load.

In order to implement the above embodiments, the present disclosure also proposes a non-transitory computer-readable storage medium having a computer program stored thereon. The computer program, when executed by a processor, implements the energy-saving control method provided by the embodiment of the first or second aspect.

The non-transitory computer-readable storage medium of the embodiment of the present disclosure enables the authorized device under remote control to perform the energy-saving operation based on the demand instruction by performing the energy-saving control method of the first or second aspect of the present disclosure, which not only can improve the user's selectivity to bring convenience to the user's life, but also can achieve the expected energy load reduction to effectively alleviate the electricity load.

In the specification, descriptions with reference to the terms "an embodiment," "some embodiments," "examples," "specific examples," or "some examples" etc. mean that specific features, structure, materials or characteristics described in conjunction with the embodiment or example are included in at least one embodiment or example of the present disclosure. In this specification, the schematic representations of the above terms do not necessarily refer to the same embodiment or example. In addition, the described specific features, structures, materials or characteristics may be combined in any one or more embodiments or examples in a suitable manner. In addition, those skilled in the art may combine the different embodiments or examples and the features of the different embodiments or examples described in this specification without contradicting each other.

In addition, the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the present disclosure, "plurality" means at least two, such as two, three, etc., unless otherwise specifically defined.

Any process or method description in the flowcharts or otherwise described herein may be understood to represent a module, segment or portion of code including one or more executable instructions for implementing customized logical functions or steps of the process, and the scope of the described embodiments of the present disclosure includes alternative implementations, in which the functions may be performed substantially concurrently or in a reverse order according to the involved functions, rather than in the order as illustrated or discussed, which can be understood by those skilled in the related art of the present disclosure.

For example, the logic and/or steps represented in flowcharts or otherwise described herein may be regarded as an ordered listing of executable instructions for implementing the logical functions, and they may be embodied in any computer-readable medium for use by an instruction executable system, apparatus or device (such as a computer-based system, a system including a processor, or other systems capable of fetching and performing the instructions from an instruction executable system, apparatus or device) or in conjunction with such instruction executable system, apparatus or devices. As for this specification, the "computer-readable medium" may be any device that may contain, store, communicate, propagate, or transport the program for use by or in conjunction with an instruction executable system, apparatus or device. More specific examples (non-exhaustive list) of the computer readable media include: electrical connections with one or more wirings (electronic devices), portable computer disk cartridges (magnetic devices), Random Access Memory (RAM), Read Only Memory (ROM), Erasable Editable Read Only Memory (EPROM or Flash Memory), fiber optic devices, and portable Compact Disc Read Only Memory (CDROM). In addition, the computer-readable medium may even be paper or other suitable medium on which the program may be printed, as the paper or other medium may be for example optically scanned and then processed for example by editing, interpretation, or other suitable ways as necessary to obtain the program electronically, and then the program is stored in the computer memory.

It should be understood that various parts of the present disclosure may be implemented in hardware, software, firmware, or a combination thereof. In the above embodiments, various steps or methods may be implemented by software or firmware stored in memory and executed by a suitable instruction executable system. For example, when they are implemented in hardware as in another embodiment, they may be implemented by any one of the following techniques known in the art: discrete logic circuits with logic gate circuits for implementing logic functions on data signals, application specific integrated circuits with suitable combinational logic gate circuits, Programmable Gate Arrays (PGA), Field Programmable Gate Arrays (FPGA), or combinations thereof.

Those of ordinary skill in the art can understand that all or part of the steps of the methods according to the above embodiments may be implemented by instructing the relevant hardware through a program, and the program may be stored in a computer-readable storage medium. When the program is executed, one or a combination of the steps of the method embodiments is implemented.

In addition, the respective functional units in the respective embodiments of the present disclosure may be integrated into one processing module; or each unit may exist physically alone; or two or more units may be integrated into one module. The above integrated modules may be implemented in the form of hardware, and may also be implemented in the form of software function modules. When the integrated modules are implemented in the form of software functional modules and sold or used as independent products, they may also be stored in a computer-readable storage medium.

The above-mentioned storage medium may be a read-only memory, a magnetic disk, an optical disk, etc. Although the embodiments of the present disclosure have been illustrated and described above, it should be understood that the above embodiments are exemplary and should not be construed as limitations on the present disclosure. Those of ordinary skill in the art may make changes, modifications, substitutions and alterations to the above embodiments without departing from the scope of the present disclosure.

What is claimed is:

1. An energy-saving control method comprising:
obtaining a demand instruction, the demand instruction being configured to indicate an energy-saving operation and a performing time slot of the energy-saving operation, and the energy-saving operation being determined based on load data of a power grid and being configured to reduce a load of the power grid;
detecting whether time reaches or is outside the performing time slot;
in response to detecting that the time reaches the performing time slot, controlling an authorized device to perform the energy-saving operation;
in response to detecting that the time is outside the performing time slot, controlling the authorized device to stop performing the energy-saving operation;
after the authorized device is controlled to perform the energy-saving operation:
starting to time a performing duration of the energy-saving operation;
obtaining feedback information on an operation status of the authorized device;
performing, based on the feedback information, a timing control on the performing duration of the energy-saving operation; and
after starting to time the performing duration of the energy-saving operation:
determining, in response to failing to obtain the feedback information, that a network of the authorized device is abnormal, and suspending timing the performing duration; and
accessing the authorized device periodically to obtain the feedback information until the feedback information is obtained, and then resuming timing the performing duration;
wherein the demand instruction is generated in response to a prediction based on an environmental parameter that power consumption of the authorized device is greater than an expected power consumption.

2. The energy-saving control method according to claim 1, wherein performing the timing control includes:
determining, by comparing the feedback information with the energy-saving operation, whether a user manual operation configured to stop performing the energy-saving operation is detected by the authorized device;
continuing timing the performing duration in response to determining that the user manual operation fails to be detected; and
stopping timing the performing duration in response to determining that the user manual operation is detected.

3. The energy-saving control method according to claim 2, wherein determining whether the user manual operation is detected by the authorized device includes:
determining, in response to the feedback information matching the energy-saving operation, that the user manual operation fails to be detected; and
determining, in response to the feedback information mismatching the energy-saving operation, that the user manual operation is detected.

4. The energy-saving control method according to claim 2,
wherein:
the demand instruction is further configured to indicate a device identifier of the authorized device; and
controlling the authorized device to perform the energy-saving operation includes:
generating, based on the energy-saving operation, an energy-saving task for the authorized device, the energy-saving task including the device identifier of the authorized device and a corresponding energy-saving operation; and
performing, in response to detecting that time reaches the performing time slot, the energy-saving task based on the device identifier of the authorized device;
the method further comprising, after determining whether the user manual operation is detected by the authorized device:
deleting, in response to determining that the user manual operation is detected, the energy-saving task; and
writing, in response to determining that the user manual operation fails to be detected, the feedback information into the energy-saving task.

5. The energy-saving control method according to claim 1, further comprising: after starting to time the performing duration of the energy-saving operation:

stopping timing the performing duration in response to determining that an account bound to the authorized device is abnormal based on the feedback information.

6. The energy-saving control method according to claim 1, further comprising:
in response to detecting that time is outside the performing time slot, stopping timing the performing duration of the energy-saving operation.

7. The energy-saving control method according to claim 1, further comprising, after the timing control on the performing duration of the energy-saving operation is performed:
generating, based on the feedback information, performing status information on the energy-saving operation; and
feeding back at least the performing duration or the performing status information of the energy-saving operation to a transmitting end of the demand instruction.

8. The energy-saving control method according to claim 1, wherein:
the authorized device includes an air conditioner in a region; and
obtaining the demand instruction includes:
obtaining power grid load data and air conditioner power consumption data in the region;
determining, based on the power grid load data and the air conditioner power consumption data, power consumption saving data; and
determining energy-saving operation data of the air conditioner based on the power consumption saving data, an air conditioner energy-saving parameter, and present operation data of the air conditioner in the region, the demand instruction including the energy-saving operation data of the air conditioner.

9. The energy-saving control method according to claim 8, further comprising, before the power consumption saving data is determined:
determining whether the power grid load data satisfies a preset overload condition;
wherein determining the power consumption saving data includes:
determining, in response to the power grid load data satisfying the preset overload condition, the power consumption saving data based on the power grid load data and the air conditioner power consumption data.

10. The energy-saving control method according to claim 8, wherein determining the energy-saving operation data includes:
determining, based on the power consumption saving data and the air conditioner power consumption data, a power consumption saving ratio;
determining, based on the power consumption saving ratio and a power consumption amount of the air conditioner, a power consumption saving amount of the air conditioner; and
determining the energy-saving operation data of the air conditioner based on the power consumption saving amount of the air conditioner, the air conditioner energy-saving parameter, and the present operation data of the air conditioner.

11. The energy-saving control method according to claim 8, wherein determining the energy-saving operation data of the air conditioner includes:
determining, based on the power consumption saving data and the power consumption amount of the air conditioner in the region, the power consumption saving amount of the air conditioner; and
determining the energy-saving operation data of the air conditioner based on the power consumption saving amount of the air conditioner, the air conditioner energy-saving parameter, and the present operation data of the air conditioner.

12. The energy-saving control method according to claim 11, wherein:
the air conditioner energy-saving parameter includes a plurality of air conditioner parameters, and energy-saving amounts corresponding to a plurality of parameter changing statuses of each of the plurality of air conditioner parameters; and
determining the energy-saving operation data of the air conditioner based on the power consumption saving amount of the air conditioner, the air conditioner energy-saving parameter, and the present operation data of the air conditioner includes:
determining change information on each of the plurality of air conditioner parameters of the air conditioner based on the power consumption saving amount and the present operation data of the air conditioner, and the energy-saving amounts corresponding to the plurality of parameter changing statuses of each of the plurality of air conditioner parameters; and
determining, based on the present operation data of the air conditioner and the change information on each of the plurality of air conditioner parameters of the air conditioner, the energy-saving operation data of the air conditioner.

13. The energy-saving control method according to claim 12, wherein:
the air conditioner energy-saving parameter further includes weights of the plurality of air conditioner parameters; and
determining the change information on each of the plurality of air conditioner parameters of the air conditioner based on the power consumption saving amount and the present operation data of the air conditioner, and the energy-saving amounts corresponding to the plurality of parameter changing statuses of each of the plurality of air conditioner parameters includes:
determining the change information on each of the plurality of air conditioner parameter of the air conditioner by sequentially changing each of the plurality of air conditioner parameters of the air conditioner in a descending order of the weights.

14. A server device comprising:
a memory storing a computer program; and
a processor configured to execute the computer program to:
obtain a demand instruction, the demand instruction being configured to indicate an energy-saving operation and a performing time slot of the energy-saving operation, and the energy-saving operation being determined based on load data of a power grid and being configured to reduce a load of the power grid;
detect whether time reaches or is outside the performing time slot;
in response to detecting that the time reaches the performing time slot, control an authorized device to perform the energy-saving operation;
in response to detecting that the time is outside the performing time slot, control the authorized device to stop performing the energy-saving operation;

after the authorized device is controlled to perform the energy-saving operation:
  start to time a performing duration of the energy-saving operation;
  obtain feedback information on an operation status of the authorized device;
  perform, based on the feedback information, a timing control on the performing duration of the energy-saving operation; and
after starting to time the performing duration of the energy-saving operation:
  determine, in response to failing to obtain the feedback information, that a network of the authorized device is abnormal, and suspend timing the performing duration; and
  access the authorized device periodically to obtain the feedback information until the feedback information is obtained, and then resume timing the performing duration;
  wherein the demand instruction is generated in response to a prediction based on an environmental parameter that power consumption of the authorized device is greater than an expected power consumption.

15. An energy-saving control method comprising:
obtaining, by an authorized device, a first control message from a server, the first control message being transmitted in response to detecting that time reaches a performing time slot indicated by a demand instruction; in response to obtaining the first control message, performing, by the authorized device, an energy-saving operation indicated by the first control message, the energy-saving operation being determined based on load data of a power grid and being configured to reduce a load of the power grid;
obtaining, by the authorized device, a second control message, the second control message being transmitted in response to detecting that time is outside the performing time slot indicated by the demand instruction; and in response to obtaining the second control message, stopping, by the authorized device, performing the energy-saving operation based on the second control message; and
after the authorized device performs the energy-saving operation:
  obtaining feedback information on an operation status of the authorized device;
  performing, based on the feedback information, a timing control on a performing duration of the energy-saving operation, wherein timing of the performing duration of the energy-saving operation is started after the authorized device is controlled to perform the energy-saving operation;
wherein:
  the demand instruction is generated in response to a prediction based on an environmental parameter that power consumption of the authorized device is greater than an expected power consumption; and
  after the timing of the performing duration of the energy-saving operation is started:
    in response to a network of the authorized device being abnormal, the timing of the performing duration is suspended; and
    in response to the feedback information being successfully accessed by the server, the timing of the performing duration is resumed.

16. The energy-saving control method according to claim 15, further comprising, after the energy-saving operation is performed:
detecting a user manual operation;
generating, in response to the user manual operation, the feedback information on the operation status of the authorized device; and
transmitting the feedback information.

17. The energy-saving control method according to claim 16, further comprising, after the user manual operation is detected:
in response to the user manual operation, stopping, by the authorized device, performing the energy-saving operation, and performing, by the authorized device, a control instruction indicated by the user manual operation.

18. A household appliance comprising:
a memory storing a computer program; and
a processor configured to execute the computer program to perform the method of claim 15.

* * * * *